US008057299B2

(12) United States Patent
Yoshizawa

(10) Patent No.: US 8,057,299 B2
(45) Date of Patent: Nov. 15, 2011

(54) GAMING MACHINE ACCEPTING SIDE BET AND CONTROL METHOD THEREOF

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 545 days.

(21) Appl. No.: 12/241,440

(22) Filed: Sep. 30, 2008

(65) Prior Publication Data

US 2009/0203429 A1 Aug. 13, 2009

Related U.S. Application Data

(60) Provisional application No. 61/028,375, filed on Feb. 13, 2008.

(51) Int. Cl.
*A63F 9/24* (2006.01)
*G06F 17/00* (2006.01)

(52) U.S. Cl. ............................. 463/25; 463/20; 273/292

(58) Field of Classification Search ................... 273/146
See application file for complete search history.

(56) References Cited

U.S. PATENT DOCUMENTS 5,263,715 A * 11/1993 Matsumoto et al. ............ 463/22
5,413,351 A 5/1995 Franklin
7,775,869 B2 * 8/2010 Pau et al. ........................ 463/16
2004/0251629 A1 * 12/2004 Oliva ............................ 273/274
2006/0033281 A1 * 2/2006 Wong ............................ 273/292
2006/0068900 A1 * 3/2006 Englman ......................... 463/25
2006/0097447 A1 * 5/2006 Tucker .......................... 273/146
2006/0163807 A1 * 7/2006 Crenshaw et al. ............ 273/146
2007/0026947 A1 2/2007 Chun
2007/0040331 A1 * 2/2007 Scheb et al. .................. 273/274
2008/0125212 A1 * 5/2008 Schofield ........................ 463/20
2009/0045571 A1 * 2/2009 Abdoullaev .................. 273/146
2009/0117992 A1 * 5/2009 Jansiri et al. .................... 463/22

FOREIGN PATENT DOCUMENTS

WO WO 2007/016776 A1 2/2007

* cited by examiner

*Primary Examiner* — Paul A. D'Agostino
(74) *Attorney, Agent, or Firm* — NDQ&M Watchstone LLP

(57) ABSTRACT

A gaming machine according to the present invention includes: a gaming portion where a plurality of main dice roll and stop; a station having an input device with which a player can place a normal BET and a side BET different from the normal BET, based on a prediction of the outcomes of dice, and an image display capable of displaying an image; and a controller programmed to execute the processing of (C) rolling and stopping the plurality of the main dice in the gaming portion, (D) determining the outcome of an N-sided (N being an integer of seven or more) sub die to be displayed to the image display provided in the station, and (E) displaying at least an image showing the state of stopping of the sub die with the outcome determined in the processing (D), to the image display provided in the station where the side BET has been input.

7 Claims, 17 Drawing Sheets

Fig. 14

| Number of sides | Pattern 1 | Pattern 2 | Pattern 3 | Pattern 4 | Pattern 5 |
|---|---|---|---|---|---|
| 7 | ×1 | ×1. 5 | ×1 | ×1 | ×1. 2 |
| 8 | ×1 | ×1. 6 | ×1 | ×1 | ×1. 3 |
| 9 | ×1 | ×1. 7 | ×1. 2 | ×1 | ×1. 4 |
| 10 | ×1 | ×1. 8 | ×1. 2 | ×1 | ×1. 5 |
| 11 | ×1 | ×1. 9 | ×1. 4 | ×1 | ×1. 6 |
| 12 | ×1 | ×2 | ×1. 4 | ×1 | ×1. 7 |

GAMING MACHINE ACCEPTING SIDE BET AND CONTROL METHOD THEREOF

CROSS-REFERENCE TO RELATED APPLICATIONS

This application claims benefit of priority based on U.S. Provisional Patent Application No. 61/028,375 filed on Feb. 13, 2008. The contents of this application are incorporated herein by reference in their entirety.

BACKGROUND OF THE INVENTION

1. Field of the Invention

The present invention relates to a gaming machine accepting a side BET and a control method thereof.

2. Discussion of the Background

There have been conventionally known a variety of table games, and for example, as disclosed in WO 07/016776-A1, US 2007/0026947-A1, and U.S. Pat. No. 5,413,351, a game genre called a dice game exists among those table games.

Among the dice games, there exists, for example, a gaming method in which a dealer throws dice after a player has performed a BET operation, and in the case where the dealer throws a predetermined combination, the player can throw dice to obtain a high payout, as disclosed in U.S. Pat. No. 5,413,351. Further, in Asia, Sic Bo is known as a long-time familiar dice game in which a player places a BET based on a prediction of the outcomes of three dice.

Sic Bo is widely known as an ancient Chinese dice game. In Sic Bo, a player places a BET based on a prediction of the outcomes of the respective three dice or a combination of the outcomes of the three dice. The way of placing a BET and payout rates are displayed on a table where a player is seated (or they may be displayed to an image display). The table is provided with: an area for placing a BET based on a prediction of the outcome of one die; an area for placing a BET based on a prediction that the outcomes of two dice will be the same; an area for placing a BET based on a prediction that the outcomes of the three dice will be the same; an area for placing a BET based on a prediction of a combination of the outcomes of two dice; an area for placing a BET based on a prediction of the total value of the outcomes of the three dice; and the like. As for the payout, although it cannot be uniformly set due to different circumstances of regions, countries, or the like, it has been set to the degree of 1:1 to 1:180 according to an appearance probability.

Since the dice game disclosed in U.S. Pat. No. 5,413,351 is executed according to a particular rule, there has been a problem that the game is unfamiliar to the player and lacks interesting aspects. Further, in typical Sic Bo widely known, types of BETs are limited and hence the player might soon be tired of the game.

An object of the present invention is to provide a gaming machine capable of enhancing interesting aspects of a game so as to prevent a player from becoming tired of the game, and a control method of the gaming machine.

The contents of WO 07/016776-A1, US 2007/0026947-A1, and U.S. Pat. No. 5,413,351 are incorporated herein by reference in their entirety.

SUMMARY OF THE INVENTION

A first aspect of the present invention provides a gaming machine having the following configuration.

Namely, the gaming machine includes: a gaming portion in which a plurality of main dice roll and stop; a station having an input device with which a player can place a normal BET and a side BET different from the normal BET, based on a prediction of the outcomes of dice, and an image display capable of displaying an image; and a controller. The controller is programmed to execute the processing of (A) accepting the normal BET from the input device provided in the station, (B) accepting the side BET from the input device provided in the station, (C) rolling and stopping the plurality of the main dice in the gaming portion, (D) determining the outcome of an N-sided (N being an integer of seven or more) sub die to be displayed to the image display provided in the station, (E) displaying at least an image showing the state of stopping of the sub die with the outcome determined in the processing (D), to the image display provided in the station where the side BET has been input, (F) offering a normal payout based on the outcomes of the plurality of the main dice stopped in the processing (C) and the normal BET accepted in the processing (A), and (G) offering a special payout based on the outcomes of the plurality of the main dice stopped in the processing (C), the outcome of the sub die displayed in the processing (E), and the side BET accepted in the processing (B).

According to the above-mentioned gaming machine, a side BET can be input based on a prediction of the outcomes of a plurality of main dice and the outcome of a sub die. Since the number of betting objects is large in the side BET as compared with the normal BET in which only the outcomes of the plurality of the main dice are predicted, a player has wider options in betting so as to be prevented from becoming tired of the game. Further, with the number of dice increased, a betting object having an extremely low appearance probability is generated; hence, for example by increasing a payout rate of that betting object, it is possible to make the player have a high expectation toward a high payout.

An image showing the state of stopping of the sub die is displayed only in a station where the side BET has been input. This allows the player to see that another player has placed a side BET when looking at display of the image showing the state of stopping of the sub die in a station where another player is playing a game. Therefore, according to the above-mentioned gaming machine, it is possible to make players around the player having placed the side BET feel a desire to place a side BET.

The sub die displayed in the station is not a six-sided die used in a normal dice game, but an N-sided (N being an integer of seven or more) die. Accordingly, it is possible to make the player feel enjoyment which cannot be felt in the conventional dice games, so that the interesting aspects of the game can be enhanced.

It is desirable that the gaming machine further has the following configuration.

The processing (G) includes (G-1) offering a first special payout in amount corresponding to the number of dice with the same outcome, when the outcome of the sub die displayed in the processing (E) is six or less, and (G-2) offering a second special payout, when the outcome of the sub die displayed in the processing (E) is seven or more and the outcome of the sub die displayed in the processing (E) and a total value of the outcomes of the plurality of the main dice stopped in the processing (C) are the same numeric value.

The sub die displayed in the station is not a six-sided die used in a normal dice game, but an N-sided (N being an integer of seven or more) die. Payout offering conditions are set being different in the case of the outcome of the sub die being six or less and in the case of the outcome of the sub die being seven or more. As thus described, since the payout offering conditions are set being different depending on the outcome of the sub die, it is possible to make the player place the BET while feeling enjoyment. Further, in the case of the outcome of the sub die being seven or more, a special payout is offered when the outcome of the sub die and a total value of the outcomes of the plurality of the main dice are the same numeric value. Setting the payout offering condition that does not exist in the conventional dice games can further enhance the interesting aspects of the game.

It is desirable that the gaming machine further has the following configuration.

The controller is further programmed to execute the processing of (H) executing a chance game in which an amount of the special payout to be offered in the processing (G) may be changed when the outcome of the sub die displayed in the processing (E) is a predetermined numeric value. The processing (G) includes (G-3) determining the amount of the special payout based on a result of the chance game executed in the processing (H).

A chance game in which an amount of the special payout to be offered may be changed is executed when the outcome of the sub die is a predetermined numeric value, and the amount of the special payout is determined based on a result of the executed chance game. Executing the chance game different from the normal game can prevent the player from becoming tired of the game. Further, since the amount of the special payout to be offered may be changed, it is possible to excite the player.

A second aspect of the present invention provides a gaming machine having the following configuration.

The gaming machine includes: a gaming portion in which a plurality of main dice roll and stop; a station having an image display capable of displaying an image, and an input device with which a player can make an input of selecting a number N (N being an integer of seven or more) of sides of a sub die and can place a normal BET and a side BET different from the normal BET, based on a prediction of the outcomes of dice, the sub die being to be displayed to the image display; and a controller. The controller is programmed to execute the processing of (A) accepting the normal BET from the input device provided in the station, (B) accepting the side BET from the input device provided in the station, (C) accepting the input of selecting the number N of sides of the sub die being to be displayed to the image display from the input device provided in the station, (D) rolling and stopping the plurality of the main dice in the gaming portion, (E) determining the outcome of the sub die having the number of sides accepted in the processing (C), (F) displaying at least an image showing the state of stopping of the sub die having the number of sides accepted in the processing (C) with the outcome determined in the processing (E), to the image display provided in the station where the input of selecting the number N of sides of the sub die has been made, (G) offering a normal payout based on the outcomes of the plurality of the main dice stopped in the processing (D) and the normal BET accepted in the processing (A), and (H) offering a special payout based on the outcomes of the plurality of the main dice stopped in the processing (D), the outcome of the sub die displayed in the processing (F), and the side BET accepted in the processing (B).

According to the above gaming machine, a side BET can be input based on a prediction of the outcomes of a plurality of main dice and the outcome of a sub die. Since the number of betting objects is large in the side BET as compared with the normal BET in which only the outcomes of the plurality of the main dice are predicted, a player has wider options in betting so as to be prevented from becoming tired of the game. Further, with the number of dice increased, a betting object having an extremely low appearance probability is generated; hence, for example by increasing a payout rate of that betting object, it is possible to make the player have a high expectation toward a high payout.

An image showing the state of stopping of the sub die is displayed only in the station where the side BET has been input. This allows the player to see that another player has placed a side BET when looking at display of the image showing the state of stopping of the sub die in a station where another player is playing a game. Therefore, according to the above-mentioned gaming machine, it is possible to make players around the player having placed the side BET feel a desire to place a side BET.

The sub die displayed in the station is not a six-sided die used in a normal dice game, but an N-sided (N being an integer of seven or more) die. Accordingly, it is possible to make the player feel enjoyment which cannot be felt in the conventional dice games, so that the interesting aspects of the game can be enhanced.

The player can select the number N of sides of the sub die. Therefore, since the sub die having the number of sides selected by the player at his or her will can be displayed in the station, it is possible to make the player feel satisfied. Further, for example, in a configuration that a payout rate is determined in accordance with an appearance probability of a combination of the outcomes of the dice, a betting object with a larger payout rate is generated for the larger number of sides of the sub die. Consequently, the player can increase or decrease the payout rate by selecting the number N of sides of the sub die so as to play a game with the payout rate in accordance with his or her preference.

It is desirable that the gaming machine further has the following configuration.

The controller is further programmed to execute the processing of (I) executing a chance game in which an amount of the special payout to be offered in the processing (H) may be changed when the outcome of the sub die displayed in the processing (F) is a predetermined numeric value. The processing (H) includes (H-1) determining the larger amount of the special payout for the larger number N of sides of the sub die accepted in the processing (C), based on a result of the chance game executed in the processing (I).

A chance game in which an amount of the special payout to be offered may be changed is executed when the outcome of the sub die is a predetermined numeric value, and the amount of the special payout is determined based on a result of the executed chance game. Executing the chance game different from the normal game can prevent the player from becoming tired of the game. Further, since the amount of the special payout to be offered may be changed, it is possible to excite the player. Further, a larger amount of the special payout is determined for the larger number N of sides of the sub die. Moreover, the probability that the outcome of the sub die becomes the predetermined numeric value decreases with an increase in the number N of sides of the sub die; hence, for example by increasing the payout rate in accordance with a decreasing ratio of the probability, it is possible to make the player have a high expectation toward a high payout.

It is desirable that the gaming machine further has the following configuration.

The input device further enables the player to make an input of selecting the predetermined numeric value. The controller is further programmed to execute processing of (J) accepting the input of selecting the predetermined numeric value from the input device provided in the station. The processing (I) is processing of executing the chance game in which the amount of the special payout to be offered in the processing (H) may be changed when the outcome of the sub die displayed in the processing (F) is the predetermined numeric value accepted in the processing (J).

The player can select the predetermined numeric value. Therefore, it is possible for the player to select the predetermined numeric value based on a prediction of the outcome of the sub die, so that the player gets into the game.

A third aspect of the present invention provides a gaming machine having the following configuration.

Namely, the gaming machine includes: a main image display capable of displaying an image; a station having an input device with which a player can place a normal BET and a side BET different from the normal BET, based on a prediction of the outcomes of dice, and an image display capable of displaying an image; and a controller. The controller is programmed to execute the processing of (A) accepting the normal BET from the input device provided in the station, (B) accepting the side BET from the input device provided in the station, (C) determining the outcomes of a plurality of main dice to be displayed to the main image display, (D) displaying at least an image showing the state of stopping of the plurality of the main dice with the outcomes determined in the processing (C), to the main image display, (E) determining the outcome of an N-sided (N being an integer of seven or more) sub die to be displayed to the image display provided in the station, (F) displaying at least an image showing the state of stopping of the sub die with the outcome determined in the processing (E), to the image display provided in the station where the side BET has been input, (G) offering a normal payout based on the outcomes of the plurality of the main dice displayed in the processing (D) and the normal BET accepted in the processing (A), and (H) offering a special payout based on the outcomes of the plurality of the main dice displayed in the processing (D), the outcome of the sub die displayed in the processing (F), and the side BET accepted in the processing (B).

According to the above-mentioned gaming machine, a side BET can be input based on a prediction of the outcomes of the plurality of the main dice and the outcome of the sub die. Since the number of betting objects is large in the side BET as compared with the normal BET in which only the outcomes of the plurality of the main dice are predicted, the player has wider options in betting so as to be prevented from becoming tired of the game. Further, with the number of dice increased, a betting object having an extremely low appearance probability is generated; hence, for example by increasing a payout rate of that betting object, it is possible to make the player have a high expectation toward a high payout.

An image showing the state of stopping of the sub die is displayed only in a station where the side BET has been input. This allows the player to see that another player has placed a side BET when looking at display of the image showing the state of stopping of the sub die in a station where another player is playing a game. Therefore, according to the above-mentioned gaming machine, it is possible to make players around the player having placed the side BET feel a desire to place a side BET.

The sub die displayed in the station is not a six-sided die used in a normal dice game, but an N-sided (N being an integer of seven or more) die. Accordingly, it is possible to make the player feel enjoyment which cannot be felt in the conventional dice games, so that the interesting aspects of the game can be enhanced.

It is desirable that the gaming machine further has the following configuration.

The processing (H) includes (H-1) offering a first special payout in amount corresponding to the number of dice with the same outcome, when the outcome of the sub die displayed in the processing (F) is six or less, and (H-2) offering a second special payout, when the outcome of the sub die displayed in the processing (F) is seven or more and the outcome of the sub die displayed in the processing (F) and a total value of the outcomes of the plurality of the main dice displayed in the processing (D) are the same numeric value.

The sub die displayed in the station is not a six-sided die used in a normal dice game, but an N-sided (N being an integer of seven or more) die. Payout offering conditions are set being different in the case of the outcome of the sub die being six or less and in the case of the outcome of the sub die being seven or more. As thus described, since the payout offering conditions are set being different depending on the outcome of the sub die, it is possible to make the player place the BET while feeling enjoyment. Further, in the case of the outcome of the sub die being seven or more, a special payout is offered when the outcome of the sub die and a total value of the outcomes of the plurality of the main dice are the same numeric value. Setting the payout offering condition that does not exist in the conventional dice games can further enhance the interesting aspects of the game.

It is desirable that the gaming machine further has the following configuration.

The controller is further programmed to execute the processing of (I) executing a chance game in which an amount of the special payout to be offered in the processing (H) may be changed when the outcome of the sub die displayed in the processing (F) is a predetermined numeric value. The processing (H) includes (H-3) determining the amount of the special payout based on a result of the chance game executed in the processing (I).

A chance game in which an amount of the special payout to be offered may be changed is executed when the outcome of the sub die is a predetermined numeric value, and the amount of the special payout is determined based on a result of the executed chance game. Executing the chance game different from the normal game can prevent the player from becoming tired of the game. Further, since the amount of the special payout to be offered may be changed, it is possible to excite the player.

A fourth aspect of the present invention provides a gaming machine having the following configuration.

Namely, the gaming machine includes: a main image display capable of displaying an image; a station having an image display capable of displaying an image, and an input device with which a player can make an input of selecting the number N (N being an integer of seven or more) of sides of a sub die and can place a normal BET and a side BET different from the normal BET, based on a prediction of the outcomes of dice, the sub die being to be displayed to the image display; and a controller. The controller is programmed to execute the processing of (A) accepting the normal BET from the input device provided in the station, (B) accepting the side BET from the input device provided in the station, (C) accepting the input of selecting the number N of sides of the sub die being to be displayed to the image display from the input device provided in the station, (D) determining the outcomes of a plurality of main dice to be displayed to the main image display, (E) displaying at least an image showing the state of stopping of the plurality of the main dice with the outcomes determined in the processing (D), to the main image display, (F) determining the outcome of the sub die having the number of sides accepted in the processing (C), (G) displaying at least an image showing the state of stopping of the sub die having the number of sides accepted in the processing (C) with the outcome determined in the processing (F), to the image display provided in the station where the input of selecting the number N of sides of the sub die has been made, (H) offering a normal payout based on the outcomes of the plurality of the main dice displayed in the processing (E) and the normal BET accepted in the processing (A), and (I) offering a special payout based on the outcomes of the plurality of the main dice displayed in the processing (E), the outcome of the sub die displayed in the processing (G), and the side BET accepted in the processing (B).

According to the above gaming machine, a side BET can be input based on a prediction of the outcomes of a plurality of main dice and the outcome of a sub die. Since the number of betting objects is large in the side BET as compared with the normal BET in which only the outcomes of the plurality of the main dice are predicted, a player has wider options in betting so as to be prevented from becoming tired of the game. Further, with the number of dice increased, a betting object having an extremely low appearance probability is generated; hence, for example by increasing a payout rate of that betting object, it is possible to make the player have a high expectation toward a high payout.

An image showing the state of stopping of the sub die is displayed only in the station where the side BET has been input. This allows the player to see that another player has placed a side BET when looking at display of the image showing the state of stopping of the sub die in a station where another player is playing a game. Therefore, according to the above gaming machine, it is possible to make players around the player having the side BET feel a desire to place a side BET.

The sub die displayed in the station is not a six-sided die used in a normal dice game, but an N-sided (N being an integer of seven or more) die. Accordingly, it is possible to make the player feel enjoyment which cannot be felt in the conventional dice games, so that the interesting aspects of the game can be enhanced.

The player can select the number N of sides of the sub die. Therefore, since the sub die having the number of sides selected by the player at his or her will can be displayed in the station, it is possible to make the player feel satisfied.

It is desirable that the gaming machine further has the following configuration.

The controller is further programmed to execute the processing of (J) executing a chance game in which an amount of the special payout to be offered in the processing (I) may be changed when the outcome of the sub die displayed in the processing (G) is a predetermined numeric value. The processing (I) includes (I-1) determining the larger amount of the special payout for the larger number N of sides of the sub die accepted in the processing (C), based on a result of the chance game executed in the processing (J).

A chance game in which an amount of the special payout to be offered may be changed is executed when the outcome of the sub die is a predetermined numeric value, and the amount of the special payout is determined based on a result of the executed chance game. Executing the chance game different from the normal game can prevent the player from becoming tired of the game. Further, since the amount of the special payout to be offered may be changed, it is possible to excite the player. Further, a larger amount of the special payout is determined for the larger number N of sides of the sub die. Moreover, the probability that the outcome of the sub die becomes the predetermined numeric value decreases with an increase in the number N of sides of the sub die; hence, for example by increasing the payout rate in accordance with a decreasing ratio of the probability, it is possible to make the player have a high expectation toward a high payout.

It is desirable that the gaming machine further has the following configuration.

The input device further enables the player to make an input of selecting the predetermined numeric value. The controller is further programmed to execute the processing of (K) accepting the input of selecting the predetermined numeric value from the input device provided in the station. The processing (J) is processing of executing the chance game in which the amount of the special payout to be offered in the processing (I) may be changed when the outcome of the sub die displayed in the processing (G) is the predetermined numeric value accepted in the processing (K).

The player can select the predetermined numeric value. Therefore, it is possible for the player to select the predetermined numeric value based on a prediction of the outcome of the sub die, so that the player gets into the game.

The present invention further provides a control method of a gaming machine, having the following configuration.

Namely, the control method of a gaming machine, the method includes the steps of: (A) accepting a normal BET from an input device with which a player can place the normal BET and a side BET different from the normal BET, based on a prediction of the outcomes of dice, the input device being provided in a station; (B) accepting the side BET from the input device provided in the station; (C) rolling and stopping a plurality of main dice in a gaming portion in which the plurality of the main dice roll and stop; (D) determining the outcome of an N-sided (N being an integer of seven or more) sub die to be displayed to an image display capable of displaying an image, the image display being provided in the station; (E) displaying at least an image showing the state of stopping of the sub die with the outcome determined in the step (D), to the image display provided in the station where the side BET has been input; (F) offering a normal payout based on the outcomes of the plurality of the main dice stopped in the step (C) and the normal BET accepted in the step (A); and (G) offering a special payout based on the outcomes of the plurality of the main dice stopped in the step (C), the outcome of the sub die displayed in the step (E), and the side BET accepted in the step (B).

According to the above-mentioned control method of the gaming machine, a side BET can be input based on a prediction of the outcomes of the plurality of the main dice and the outcome of the sub die. Since the number of betting objects is large in the side BET as compared with the normal BET in which only the outcomes of the plurality of the main dice are predicted, the player has wider options in betting so as to be prevented from becoming tired of the game. Further, with the number of dice increased, a betting object having an extremely low appearance probability is generated; hence, for example by increasing a payout rate of that betting object, it is possible to make the player have a high expectation toward a high payout.

An image showing the state of stopping of the sub die is displayed only in a station where the side BET has been input. This allows the player to see that another player has placed a side BET when looking at display of the image showing the state of stopping of the sub die in a station where another player is playing a game. Therefore, according to the above control method of the gaming machine, it is possible to make players around the player having placed the side BET feel a desire to place a side BET.

The sub die displayed in the station is not a six-sided die used in a normal dice game, but an N-sided (N being an integer of seven or more) die. Accordingly, it is possible to make the player feel enjoyment which cannot be felt in the conventional dice games, so that the interesting aspects of the game can be enhanced.

The present invention further provides a control method of a gaming machine, having the following configuration.

The control method of a gaming machine, the method includes the steps of: (A) accepting a normal BET from an input device with which a player can make an input of selecting the number N (N being an integer of seven or more) of sides of a sub die and can place the normal BET and a side BET different from the normal BET based on a prediction of the outcomes of dice, the input device being provided in a station and the sub die being to be displayed to an image display capable of displaying an image; (B) accepting the side BET from the input device provided in the station; (C) accepting the input of selecting the number N of sides of the sub die being to be displayed to the image display, from the input device provided in the station; (D) rolling and stopping a plurality of main dice in a gaming portion in which the plurality of the main dice roll and stop; (E) determining the outcome of the sub die having the number of sides accepted in the step (C); (F) displaying at least an image showing the state of stopping of the sub die having the number of sides accepted in the step (C) with the outcome determined in the step (E), to the image display provided in the station where the input of selecting the number N of sides of the sub die has been made; (G) offering a normal payout based on the outcomes of the plurality of the main dice stopped in the step (D) and the normal BET accepted in the step (A); and (H) offering a special payout based on the outcomes of the plurality of the main dice stopped in the step (D), the outcome of the sub die displayed in the step (F), and the side BET accepted in the step (B).

According to the above control method of the gaming machine, a side BET can be input based on a prediction of the outcomes of the plurality of main dice and the outcome of a sub die. Since the number of betting objects is large in the side BET as compared with the normal BET in which only the outcomes of the plurality of the main dice are predicted, a player has wider options in betting so as to be prevented from becoming tired of the game. Further, with the number of dice increased, a betting object having an extremely low appearance probability is generated; hence, for example by increasing a payout rate of that betting object, it is possible to make the player have a high expectation toward a high payout.

An image showing the state of stopping of the sub die is displayed only in the station where the side BET has been input. This allows the player to see that another player has placed a side BET when looking at display of the image showing the state of stopping of the sub die in a station where another player is playing a game. Therefore, according to the above control method of the gaming machine, it is possible to make players around the player having the side BET feel a desire to place a side BET.

The sub die displayed in the station is not a six-sided die used in a normal dice game, but an N-sided (N being an integer of seven or more) die. Accordingly, it is possible to make the player feel enjoyment which cannot be felt in the conventional dice games, so that the interesting aspects of the game can be enhanced.

The player can select the number N of sides of the sub die. Therefore, since the sub die having the number of sides selected by the player at his or her will can be displayed in the station, it is possible to make the player feel satisfied.

The present invention further provides a control method of a gaming machine, having the following configuration.

Namely, the control method of a gaming machine, the method includes the steps of: (A) accepting a normal BET from an input device with which a player can place the normal BET and a side BET different from the normal BET based on a prediction of the outcomes of dice, the input device being provided in a station; (B) accepting the side BET from the input device provided in the station; (C) determining the outcomes of a plurality of main dice to be displayed to a main image display capable of displaying an image; (D) displaying at least an image showing the state of stopping of the plurality of the main dice with the outcomes determined in the step (C), to the main image display; (E) determining the outcome of an N-sided (N being an integer of seven or more) sub die to be displayed to an image display capable of displaying an image, the image display being provided in the station; (F) displaying at least an image showing the state of stopping of the sub die with the outcome determined in the step (E), to the image display provided in the station where the side BET has been input; (G) offering a normal payout based on the outcomes of the plurality of the main dice displayed in the step (D) and the normal BET accepted in the step (A); and (H) offering a special payout based on the outcomes of the plurality of the main dice displayed in the step (D), the outcome of the sub die displayed in the step (F) and the side BET accepted in the step (B).

According to the above-mentioned control method of a gaming machine, a side BET can be input based on a prediction of the outcomes of the plurality of the main dice and the sub die. Since the number of betting objects is large in the side BET as compared with the normal BET in which only the outcomes of the plurality of the main dice are predicted, the player has wider options in betting so as to be prevented from becoming tired of the game. Further, with the number of dice increased, a betting object having an extremely low appearance probability is generated; hence, for example by increasing a payout rate of that betting object, it is possible to make the player have a high expectation toward a high payout.

An image showing the state of stopping of the sub die is displayed only in the station where the side BET has been input. This allows the player to see that another player has placed a side BET when looking at display of the image showing the state of stopping of the sub die in a station where another player is playing a game. Therefore, according to the above control method of the gaming machine, it is possible to make players around the player having placed the side BET feel a desire to place a side BET.

The sub die displayed in the station is not a six-sided die used in a normal dice game, but an N-sided (N being an integer of seven or more) die. Accordingly, it is possible to make the player feel enjoyment which cannot be felt in the conventional dice games, so that the interesting aspects of the game can be enhanced.

The present invention further provides a control method of the gaming machine, having the following configuration.

Namely, the control method of the gaming machine, the method includes the steps of: (A) accepting a normal BET from an input device with which a player can make an input of selecting the number N (N being an integer of seven or more) of sides of a sub die and can place the normal BET and a side BET different from the normal BET based on a prediction of the outcomes of dice, the input device being provided in a station and the sub die being to be displayed to an image display capable of displaying an image; (B) accepting the side BET from the input device provided in the station; (C) accepting the input of selecting the number N of sides of the sub die being to be displayed to the image display, from the input device provided in the station; (D) determining the outcomes of a plurality of main dice to be displayed to a main image display capable of displaying an image; (E) displaying at least an image showing the state of stopping of the plurality of the main dice with the outcomes determined in the step (D), to the main image display; (F) determining the outcome of the sub die having the number of sides accepted in the step (C); (G) displaying at least an image showing the state of stopping of the sub die having the number of sides accepted in the step (C) with the outcome determined in the step (F), to the image display provided in the station where the input of selecting the number N of sides of the sub die has been made; (H) offering a normal payout based on the outcomes of the plurality of the main dice displayed in the step (E) and the normal BET accepted in the step (A); and (I) offering a special payout based on the outcomes of the plurality of the main dice displayed in the step (E), the outcome of the sub die displayed in said step (G), and said side BET accepted in said step (B).

According to the above-mentioned control method of a gaming machine, a side BET can be input based on a prediction of the outcomes of the plurality of the main dice and the sub die. Since the number of betting objects is large in the side BET as compared with the normal BET in which only the outcomes of the plurality of the main dice are predicted, the player has wider options in betting so as to be prevented from becoming tired of the game. Further, with the number of dice increased, a betting object having an extremely low appearance probability is generated; hence, for example by increasing a payout rate of that betting object, it is possible to make the player have a high expectation toward a high payout.

An image showing the state of stopping of the sub die is displayed only in the station where the side BET has been input. This allows the player to see that another player has placed a side BET when looking at display of the image showing the state of stopping of the sub die in a station where another player is playing a game. Therefore, according to the above control method of the gaming machine, it is possible to make players around the player having placed the side BET feel a desire to place a side BET.

The sub die displayed in the station is not a six-sided die used in a normal dice game, but an N-sided (N being an integer of seven or more) die. Accordingly, it is possible to make the player feel enjoyment which cannot be felt in the conventional dice games, so that the interesting aspects of the game can be enhanced.

The player can select the number N of sides of the sub die. Therefore, since the sub die having the number of sides selected by the player at his or her will can be displayed in the station, it is possible to make the player feel satisfied.

BRIEF DESCRIPTION OF THE DRAWINGS

FIG. 14 is an exemplary view schematically showing a chance game pattern table.

DESCRIPTION OF THE EMBODIMENTS

Figure 1:
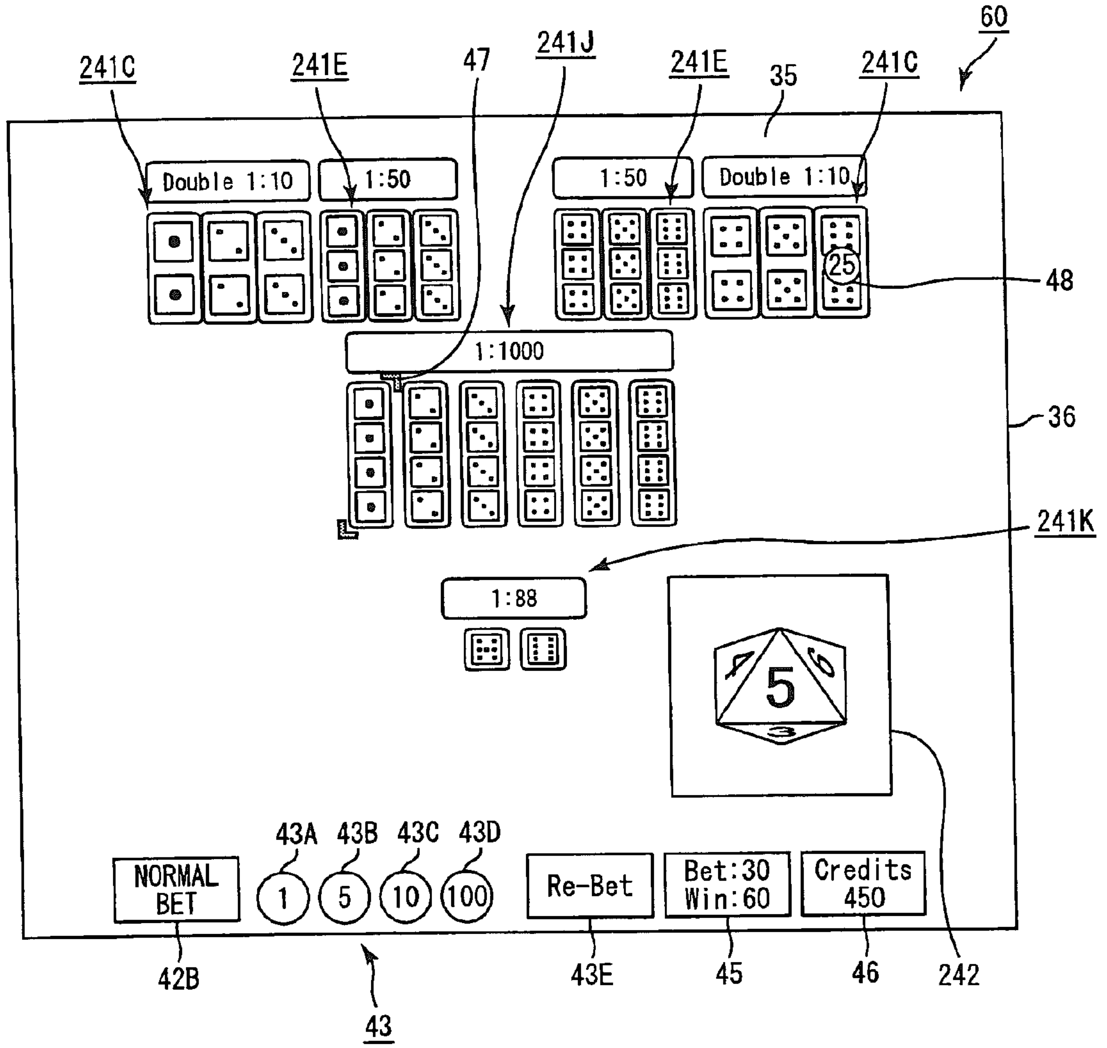
FIG. 1 is an exemplary view showing a display screen displayed to an image display.

FIG. 1 is a view showing a characteristic of a gaming machine of the present embodiment, and an exemplary view showing a display screen displayed to an image display.

Figure 2:
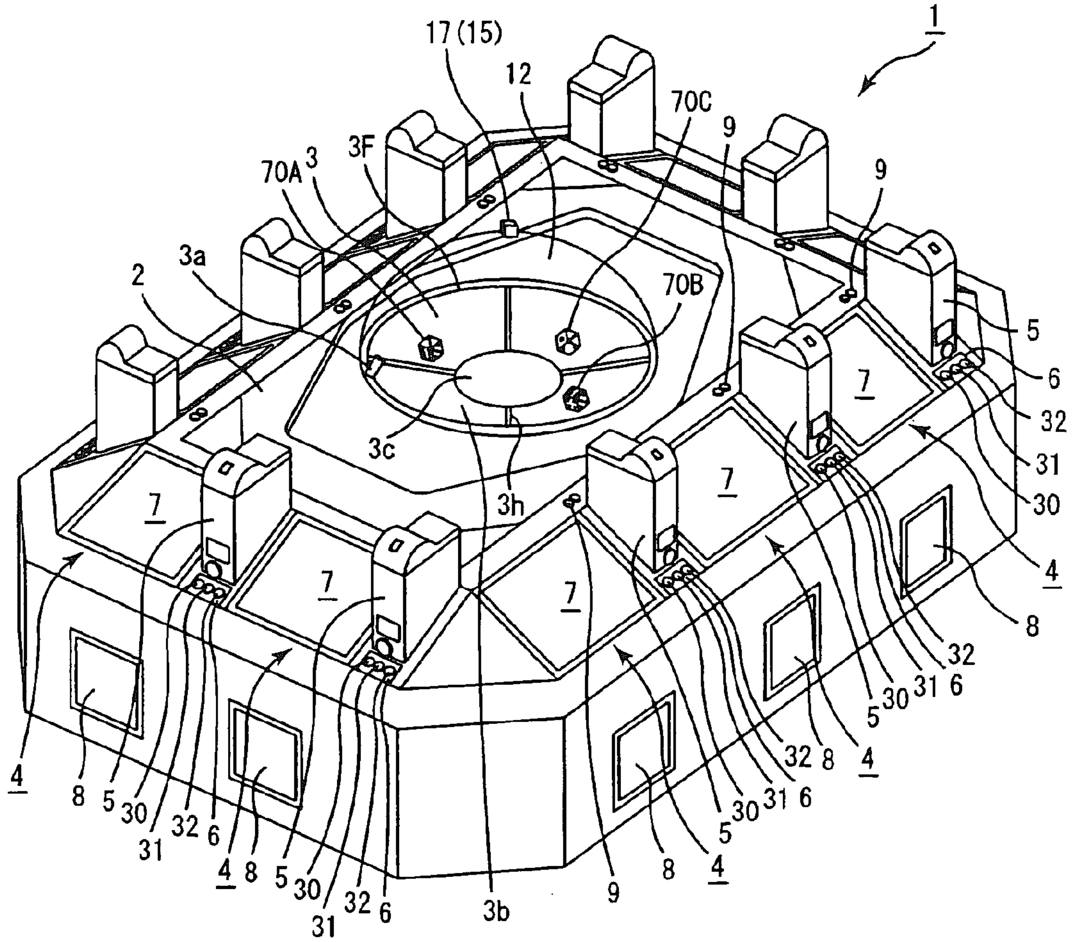
FIG. 2 is a perspective view schematically showing one example of a gaming machine according to the present invention.

FIG. 2 is a perspective view schematically showing one example of gaming machines according to the present invention.

As shown in FIG. 2, a gaming machine 1 according to the present embodiment includes: a cabinet 2 to be a body portion; a gaming portion 3 which is provided at the substantially central portion of the upper surface of the cabinet 2 and within which a plurality of main dice 70 roll and stop; and a plurality of stations 4 provided so as to surround the gaming portion 3. Each of the stations 4 includes an image display 7. A player seated at each station 4 inputs a normal BET based on a prediction of the outcomes of the main dice 70, to participate in a game. Further, the player seated at each station 4 inputs a side BET based on a prediction of the outcomes of the main dice 70 and the outcome of a sub die 700 displayed to the image display 7.

In FIG. 1, a sub dice stop image 242 showing the state of stopping of the 8-sided sub die 700 is displayed on the lower right portion of a liquid crystal screen 36 provided in the image display 7. In the present embodiment, the sub dice stop image 242 is displayed to the image display 7 provided in the station 4 having accepted the side BET input from the player.

Figure 3:
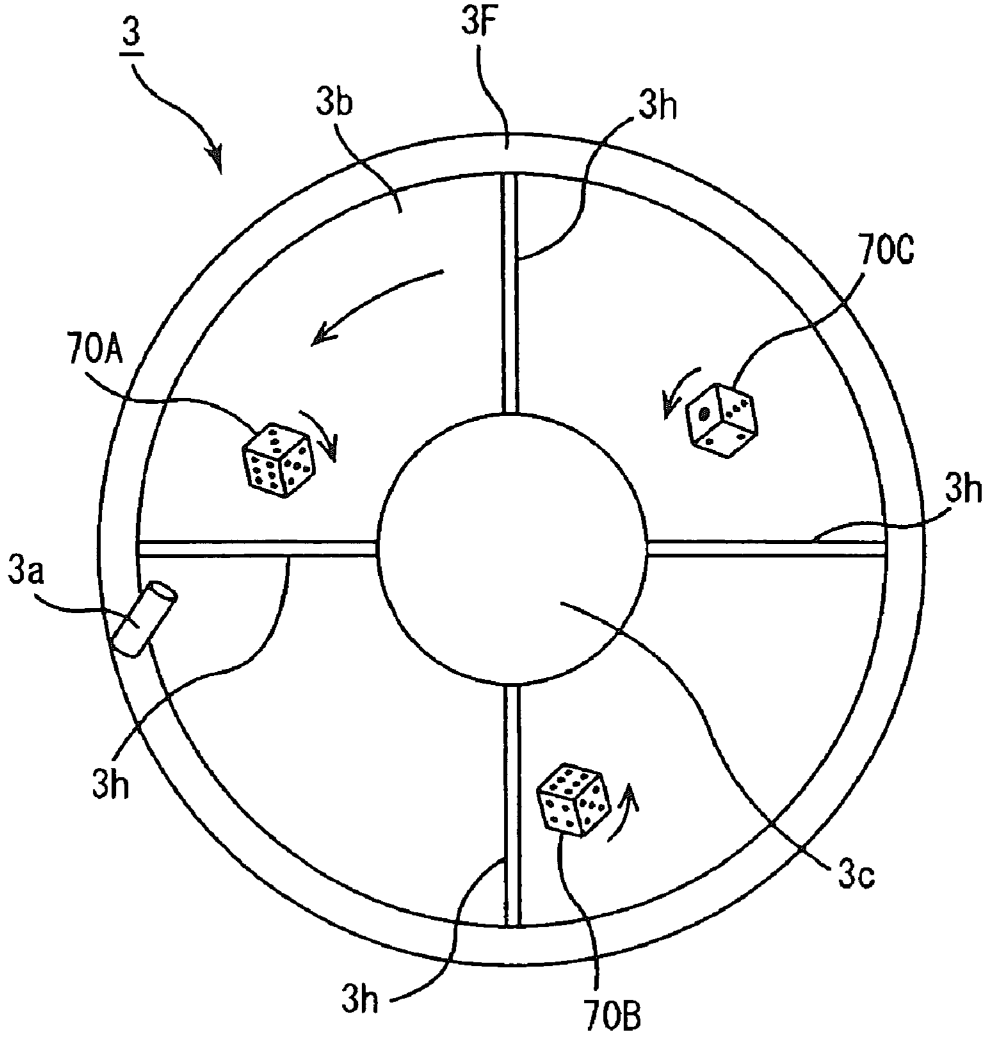
FIG. 3 is an enlarged view of a gaming portion of the gaming machine shown in FIG. 2.
Figure 4:
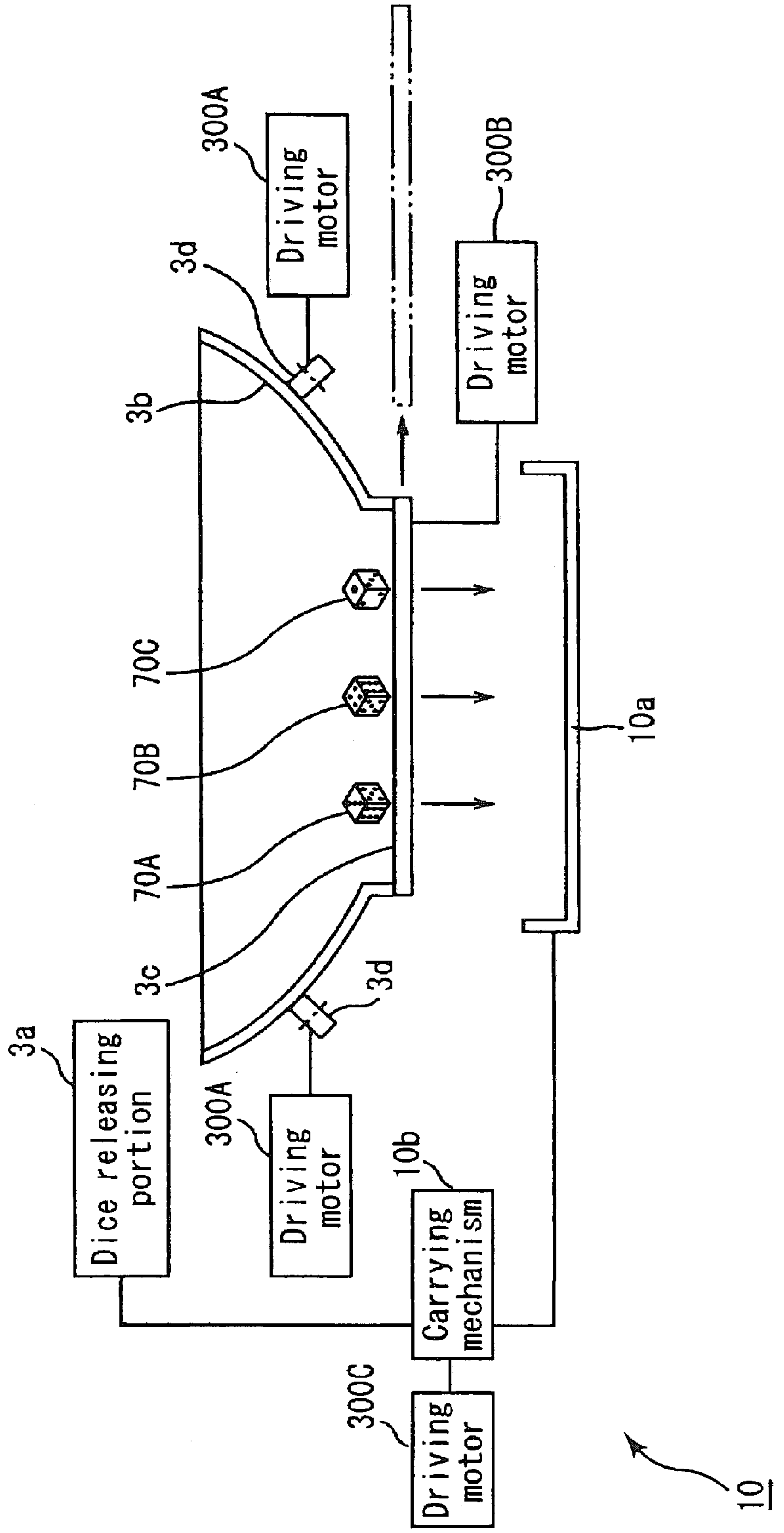
FIG. 4 is a view schematically showing a channel from collection to release of main dice in the gaming portion.

FIG. 2 is the perspective view schematically showing one example of the gaming machines according to the present invention; FIG. 3 is an enlarged view showing the gaming portion of the gaming machine shown in FIG. 2; and FIG. 4 is a view schematically showing a channel from collection to release of the main dice in the gaming portion.

The gaming machine 1 includes: the cabinet 2 to be the body portion; the gaming portion 3 which is provided at the substantially central portion of the upper surface of the cabinet 2 and in which the plurality of the main dice 70 roll and stop; and the plurality of (10 units in the present embodiment) the stations 4 provided so as to surround the gaming portion 3.

Each of the stations 4 includes: a game media accepting device 5 into which game media such as medals for use in a game are inserted; a control portion 6 having a plurality of control buttons and the like, with which a player inputs predetermined commands; and the image display 7 to which an image regarding a BET table, and the like are displayed.

While looking at the image displayed to the image display 7, the player operates the control portion 6 and the like so as to participate in a game.

On the side surfaces of the cabinet 2 where the stations 4 are installed, there are provided for each station 4 a payout exit 8 from which the game media are paid out. Further, on the right side above the image display 7 of each station 4, speakers 9 capable of outputting a sound are provided.

The control portion 6 is provided beside the image display 7 of the station 4. In the control portion 6, a confirmation button 30, a payback button 31 and a help button 32 are arranged in the order from the left, when seen from a position facing to the station 4.

The confirmation button 30 is pressed when a BET operation is confirmed after the BET operation has been performed. Further, for operations other than the BET operations, the player also presses the confirmation button 30 to confirm an input that the player has entered.

The payback button 31 is typically pressed after a game has been ended. When the payback button 31 is pressed, game media according to credits owned by the player is paid back from the payout exit 8.

The help button 32 is pressed when the game playing manner or the like is unclear to the player. Immediately after the help button 32 is pressed, a help image showing information on a variety of operations is displayed to the image display 7.

In the gaming portion 3, the plurality of the main dice 70 are rolled and stopped. In the present embodiment, the gaming machine 1 has a configuration in which three main dice 70 (a main die 70A, a main die 70B and a main die 70C) are used in the gaming portion 3.

The gaming portion 3 is formed in a circular shape and includes: a dice releasing portion 3*a* from which the main dice 70 are released; a rotating plate 3*b* that rotates the main dice 70 sequentially released from the dice releasing portion 3*a*; and a stopping plate 3*c* that finally stops the main dice 70 rotating on the rotating plate 3*b*.

The dice releasing portion 3*a* is installed in a circular outer frame 3F configuring the gaming portion 3, and from here, the main dice 70A to 70C are sequentially (or simultaneously) released toward the rotating plate 3*b*. It is to be noted that in FIGS. 2 and 3, the main dice 70 are drawn in a large size as compared with the dice releasing portion 3*a* for the sake of facilitating the description.

The rotating plate 3*b* has a shape of a truncated cone, as shown in FIG. 4. On the lower surface portion of the rotating plate 3*b*, a plurality of driving rollers 3*d* are rotatably provided in a state in contact with the rotating plate 3*b*. Simultaneously with start of a game, the plurality of the rotating rollers 3*d* are rotationally driven by a rotating-plate driving motor 300A, to rotationally drive the rotating plate 3*b*. It is to be noted that on the front surface of the rotating plate 3*b*, projections 3*h* are provided at predetermined intervals, which flip the respective main dice so as to facilitate rolling thereof when the rotating plate 3*b* is rotationally driven.

The stopping plate 3*c* is configured in a circular plate shape at the bottom portion of the rotating plate 3*b* having a shape of a truncated cone, and is an area where the main dice 70 rotating on the rotating plate 3*b* finally stop after dropping along the inclination of the rotating plate 3*b* following the stop of the rotating plate 3*b*. Namely, the main dice 70 released from the dice releasing portion 3*a* rotate on the surface of the rotating plate 3*b* by rotation of the rotating plate 3*b*, and drop along the inclination of the rotating plate 3*b* with the stop of the rotating plate 3*b*. Then, the main dice 70 finally stop on the stopping plate 3*c*.

As shown in FIG. 4, the stopping plate 3*c* is configured to be slidingly driven by a stopping-plate driving motor 300B. With the stopping plate 3*c* slidingly driven, the main dice 70 drop toward a collection/release mechanism 10.

The collection/release mechanism 10 includes: a housing portion 10*a* that receives the main dice 70 having dropped from the stopping plate 3*c*; a carrying mechanism 10*b* that carries the main dice 70 inside the housing portion 10*a* toward the dice releasing portion 3*a*; and a carriage driving motor 300C that drives the carrying mechanism 10*b*. The configuration of the collection/release mechanism 10 is not limited to a specific form, so long as it is a configuration capable of collecting the main dice 70 after a later-described outcome detecting device 15 has completed detection of the outcomes of the respective main dice 70 having stopped on the stopping plate 3*c*, and releasing the main dice 70 from the dice releasing portion 3*a*, toward the rotating plate 3*b*. Namely, for example, the carrying mechanism 10*b* can be conducted in a variety of forms, such as a configuration in which the carrying mechanism 10*b* carries the main dice 70 by air pressure from the housing portion 10*a* toward the dice releasing portion 3*a*, and a configuration in which the carrying mechanism 10*b* carries the main dice 70 by a conveyor-like carrier from the housing portion 10*a* toward the dice releasing portion 3*a*.

The gaming portion 3 is covered at its whole upper portion by a hemispheric covering member 12 made of transparent acrylic, and therefore the rotating range of the main dice 70 is regulated. In the present embodiment, the outcome detecting device 15 that detects the outcomes of the main dice 70 is installed on the top of the covering member 12. It is to be noted that in FIG. 2, the covering member 12 is drawn so as to cover only part of the gaming portion 3 for the sake of facilitating the description.

Figure 5:
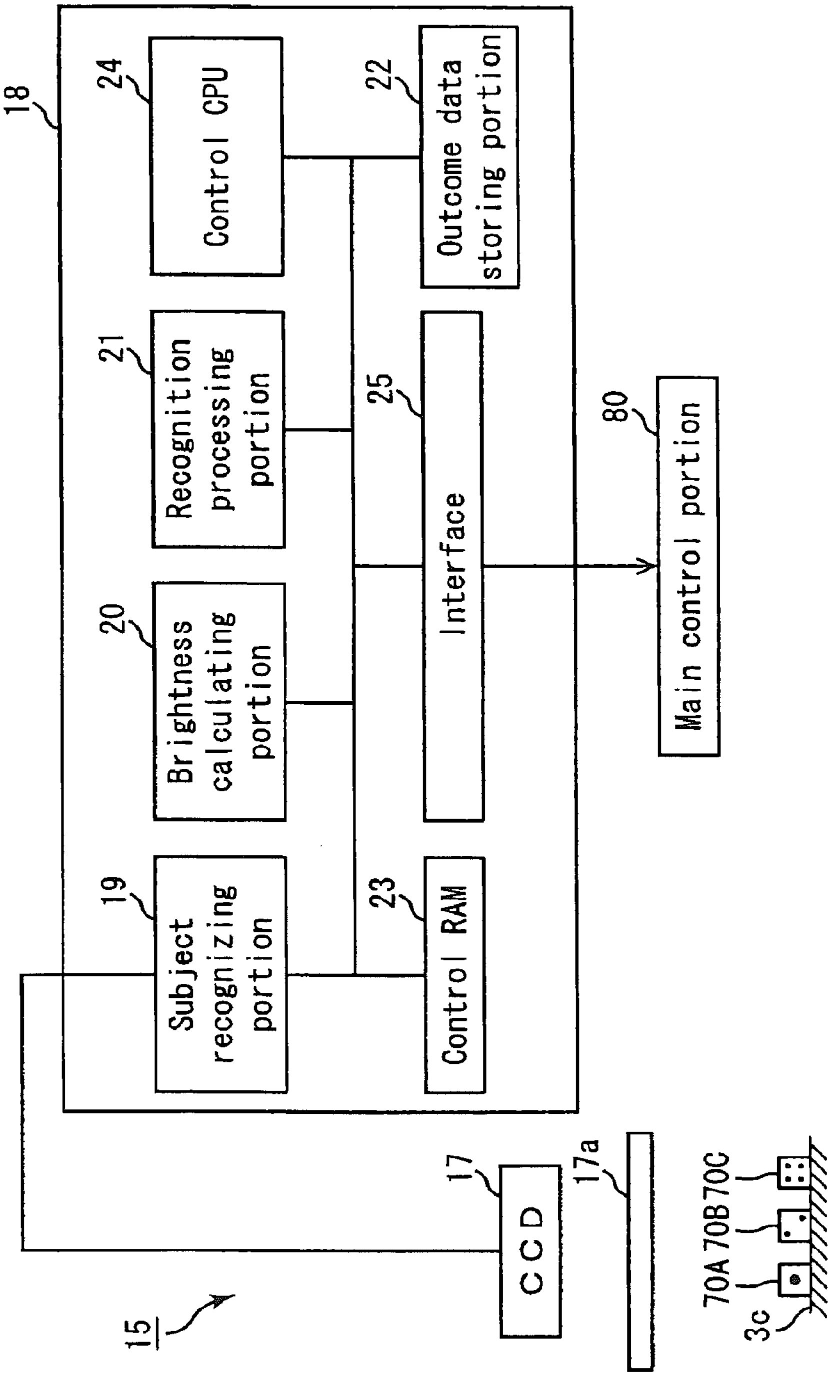
FIG. 5 is a block diagram showing an internal configuration of an outcome detecting device in the gaming machine shown in FIG. 2.

FIG. 5 is a block diagram showing an internal configuration of the outcome detecting device in the gaming machine shown in FIG. 2.

The outcome detecting device 15 in the present embodiment includes an imaging device (CCD camera) 17 that photographs the main dice 70 being the photographic subject, and an outcome detecting circuit 18 that processes the imaging signal from the imaging device 17 and then detects the outcomes of the main dice 70.

The imaging device 17 is previously made by a focus lens 17*a* to have a focus consistent with the stopping plate 3*c* in order to photograph the main dice 70 on the stopping plate 3*c*, and is exposure-controlled. The outcome detecting circuit 18 includes: a subject recognizing portion 19 that receives an imaging signal from the imaging device 17 to recognize a position of a subject (main dice 70); a brightness calculating portion 20 that calculates brightness of the image of the subject (image of the main dice) recognized in the subject recognizing portion 19; a recognition processing portion 21 that identifies the outcomes of the main dice 70; an outcome data storing portion 22 in which comparison data regarding the outcomes of the main dice 70 is stored; a control RAM 23; and a control CPU 24 that controls these units. These units are connected to one another through a bus, and controlled by the control CPU 24.

From the imaging signal of the main dice 70 received from the imaging device 17, intensity distribution of the image is measured in the subject recognizing portion 19. Measuring the intensity distribution allows identification of the positions of the main dice 70 on the stopping plate 3*c* and the surface states of the main dice 70. In the recognition processing portion 21, the identified data is subjected to processing of comparison with the comparison data previously stored in the outcome data storing portion 22, to identify the outcomes of the main dice 70.

The identified outcome information is stored into the control RAM 23, and transmitted to a later-described main control portion 80 through an interface 25. Namely, the outcome detecting device 15 identifies the outcomes of the three main dice 70 having stopped in the gaming portion 3, and transmits the identified outcome information to the main control portion 80.

Figure 6:
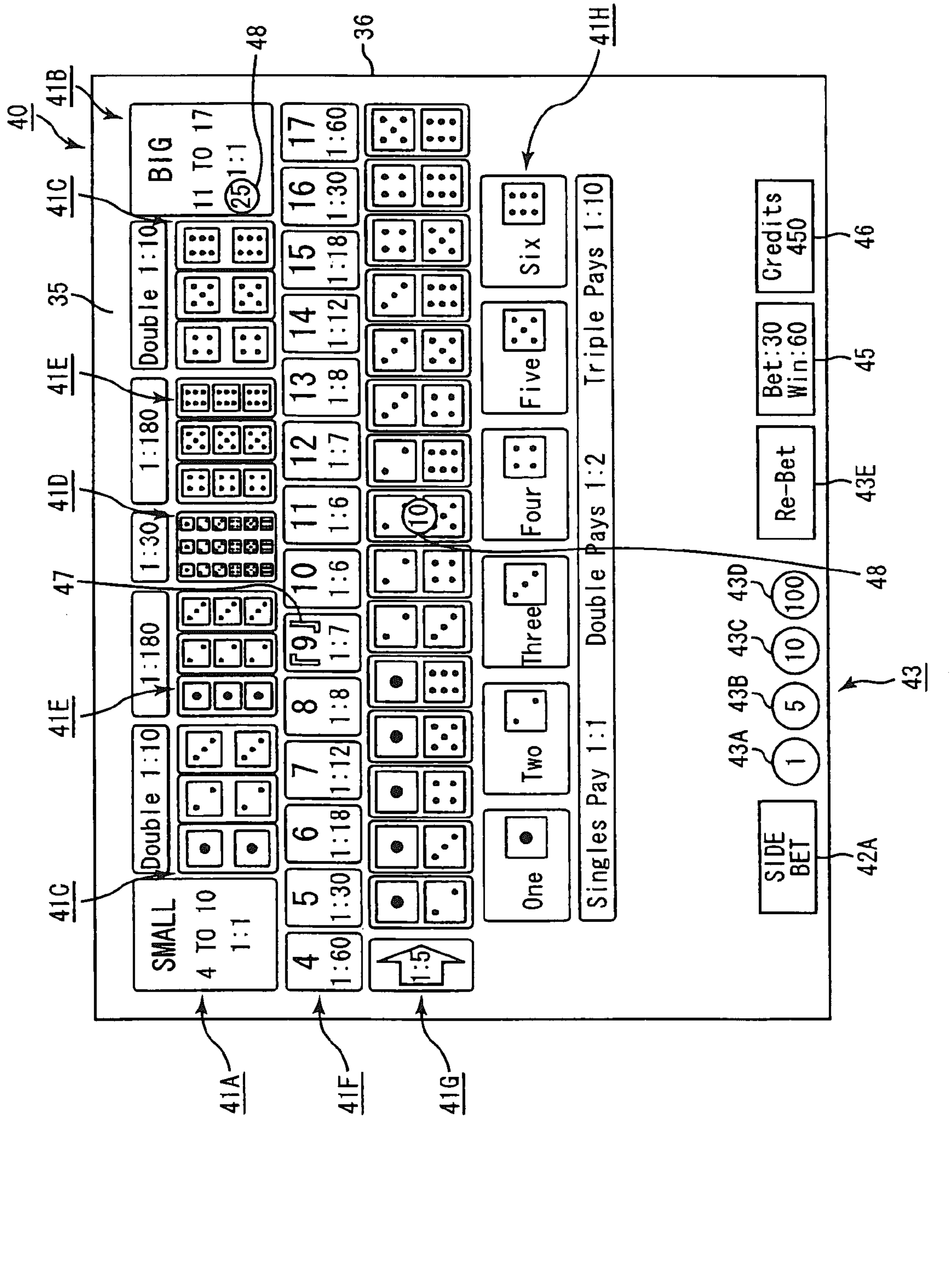
FIG. 6 is an exemplary view showing a display screen displayed to the image display.

FIG. 6 is an exemplary view showing the display screen displayed to the image display.

As shown in FIG. 6, the image display 7 is a touch-panel-type liquid crystal display having a touch panel 35 installed on its front surface; the player can select an icon and the like displayed to the liquid crystal screen 36 by touching the touch panel 35 with his/her finger or the like.

During the game, a table-type betting board (normal BET screen) 40 to be used for predicting the outcomes of the main dice 70 is displayed at a predetermined timing.

The normal BET screen 40 is specifically described.

Within the normal BET screen 40, a plurality of BET areas 41 (a BET area 41A, a BET area 41B, a BET area 41C, a BET area 41D, a BET area 41E, a BET area 41F, a BET area 41G, a BET area 41H) are displayed, and a normal BET operation is performed by touching the touch panel 35 with the finger or the like to specify the BET area 41, and making chips displayed in the specified BET area 41.

In the lower portion of the normal BET screen 40, there are displayed a side BET switching button 42A, a unit BET button 43, a Re-BET button 43E, a payback result display portion 45, and a number-of-credits display portion 46. The side BET switching button 42A is to be selected when the player wishes to place a side BET. Namely, by touching this side BET switching button 42A with the finger or the like, the normal BET screen 40 is switched to a number-of-sub-die-sides selection screen 61, a BIG chance number selection screen 62, and a side BET screen 60, which are to be described later, so that a side BET can be placed.

The unit BET button 43 is used for betting a chip on the BET area 41 specified by the player. The unit BET button 43 is configured by four types of buttons: a 1-BET button 43A; a 5-BET button 43B; a 10-BET button 43C; and a 100-BET button 43D. It is to be noted that, when the BET operation is wrongly performed, it can be performed again by touching a Re-BET button 43E with the finger or the like.

The player first touches the touch panel 35 with the finger or the like to specify the BET area 41 by using a cursor 47. At this state, touching the 1-BET button 43A with the finger or the like enables the player to BET one chip at a time (the number of BETs increases in order of 1, 2, 3, and so forth every time the 1-BET button 43A is touched with the finger or the like). Similarly, touching the 5-BET button 43B with the finger or the like enables the player to BET five chips at a time (the number of BETs increases in order of 5, 10, 15, and so forth every time the 5-BET button 43B is touched with the finger or the like). Touching the 10-BET button 43C with the finger or the like enables the player to BET ten chips at a time (the number of BETs increases in order of 10, 20, 30, and so forth every time the 10-BET button 43C is touched with the finger or the like). Touching the 100-BET button 43D with the finger or the like enables the player to BET one hundred chips at a time (the number of BETs increases in order of 100, 200, 300, and so forth every time the 100-BET button 43D is touched with the finger or the like). In the BET areas 41, the number of BET chips up to the present moment is displayed as a chip mark 48, and a number displayed within the chip mark 48 shows the number of BETs of chips.

In a payback result display portion 45, the number of BETs of chips of the player and the number of payback credits in the previous game are displayed. A number obtained by subtracting the number of BETs from the number of payback credits indicates the number of credits newly acquired by the player in the previous game.

In the number-of-credits display portion 46, the number of credits owned by the player is displayed. This number of credits decreases according to the number of BETs (one credit per one chip) when chips are BET. Further, when the BET chips are won and credits are paid back, the number of credits increases by the number of the paid back credits. It is to be noted that, when the number of credits owned by the player becomes 0, the game is ended.

Next, the BET areas 41 on the normal BET screen 40 are described.

The BET areas 41A, 41B are portions used when the player places a BET based on a prediction of the total value of the main dice 70A to 70C. Namely, the BET area 41A is selected when the total value is predicted to be 4 to 10, and the BET area 41B is selected when the total value is predicted to be 11 to 17. The payout is set to 1:1 (two chips are paid out with respect to one BET).

The BET area 41C is a portion used when the player places a BET based on a prediction that the outcomes of two main dice 70 out of the three main dice 70 will be the same. Namely, the BET area 41C is used when the player places a BET based on a prediction that any of the combinations of the outcomes (1, 1), (2, 2), (3, 3), (4, 4), (5, 5) and (6, 6) will appear, out of the outcomes of the three main dice 70; here, the payout is set to 1:10.

The BET area 41D is a portion used when the player places a BET based on a prediction that all of the outcomes of the three main dice 70 will be the same. Namely, the BET area 41D is used when the player places a BET based on a prediction that the outcomes of the three main dice 70 will be any of (1, 1, 1), (2, 2, 2), (3, 3, 3), (4, 4, 4), (5, 5, 5) and (6, 6, 6). The payout is set to 1:30.

The BET area 41E is a portion used when the player places a BET based on a prediction that all of the outcomes of the three main dice 70 will be the same, and a prediction of the value that the three main dice 70 will have. Namely, the BET area 41E is used when the player places a BET based on a prediction that the outcomes of the three main dice 70 will be (1, 1, 1), (2, 2, 2), (3, 3, 3), (4, 4, 4), (5, 5, 5) or (6, 6, 6) and also a prediction of the value that the three main dice 70 will have. The payout is set to 1:180.

The BET area 41F is a portion used when the player places a BET based on a prediction of the total value of the three main dice 70. The payout is set according to an appearance probability of the total value: the payout is 1:60 when the total value is 4 or 17; 1:30 when the total value is 5 or 16; 1:18 when the total value is 6 or 15; 1:12 when the total value is 7 or 14; 1:8 when the total value is 8 or 13; 1:7 when the total value is 9 or 12; and 1:6 when the total value is 10 or 11.

The BET area 41G is a potion used when the player places a BET based on a prediction of the outcomes of two main dice 70 out of the three main dice 70. The payout is set to 1:5.

The BET area 41H is a portion used when the player places a BET based on a prediction of the outcome of at least one main die 70 out of the main dice 70; the payout is set according to the number of the main dice 70 with the outcome corresponding to the predicted outcome.

Figure 7:
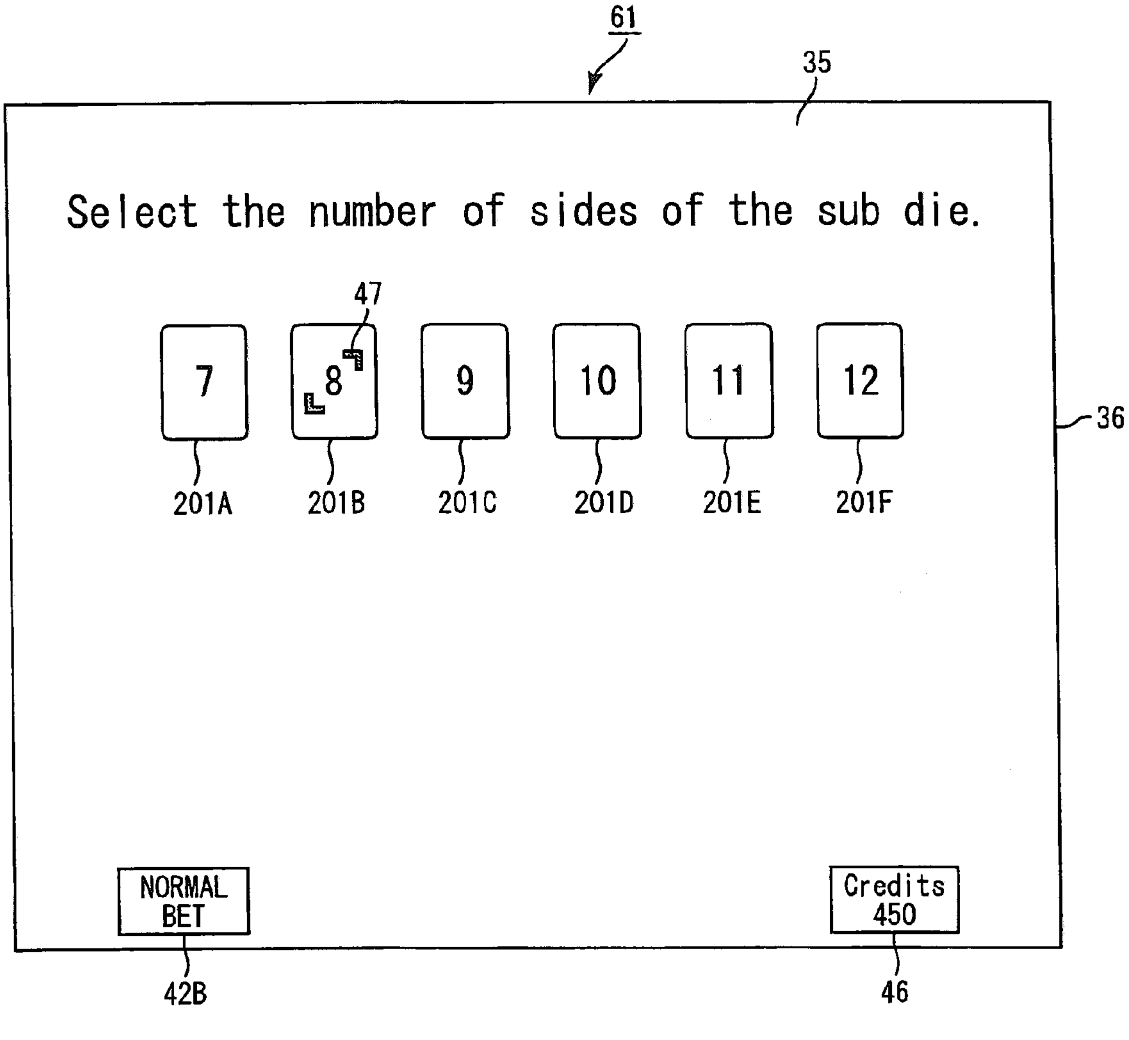
FIG. 7 is another exemplary view showing a display screen displayed to the image display.

FIG. 7 is an exemplary view showing the display screen displayed to the image display.

Touching the side BET switching button 42A on the normal BET screen 40 with the finger or the like leads to a display of a number-of-sub-die-sides selection screen 61. Here, among the display portions constituting this number-of-sub-die-sides screen 61, the display portions having the same functions as those on the normal BET screen 40 are provided with the same numerals as on the normal BET screen 40, and detailed descriptions thereof are omitted.

On the number-of-sub-die-sides selection screen 61 displayed are the number-of-sides images 201A to 201F each showing the number N of sides of the sub die 700 displayed to the image display 7. The number-of-sides image 201A is an image for selecting 7 as the number N of sides of the sub die 700. The number-of-sides image 201B is an image for selecting 8 as the number N of sides of the sub die 700. The number-of-sides image 201C is an image for selecting 9 as the number N of sides of the sub die 700. The number-of-sides image 201D is an image for selecting 10 as the number N of sides of the sub die 700. The number-of-sides image 201E is an image for selecting 11 as the number N of sides of the sub die 700. The number-of-sides image 201F is an image for selecting 12 as the number N of sides of the sub die 700.

The player touches the touch panel 35 with the finger or the like to specify the number-of-sides image 201 by using a cursor 47. For example, on the number-of-sub-die-sides selection screen 61 shown in FIG. 7, the number-of-sides image 201B showing the number of sides of the sub die 700 being 8 is specified. The player can select 8 as the number N of sides of the sub die 700 by pressing the confirmation button 30 in this state. Information on the selected number N of sides of the sub die 700 is stored in the RAM 113.

On the lower portion of the number-of-sub-die-sides screen 61, the normal BET switching button 42B is displayed. The number-of-sub-die-sides selection screen 61 is switched to the normal BET screen 40 by touching the normal BET switching button 42B with the finger or the like, so that it becomes possible to place the normal BET.

Figure 8:
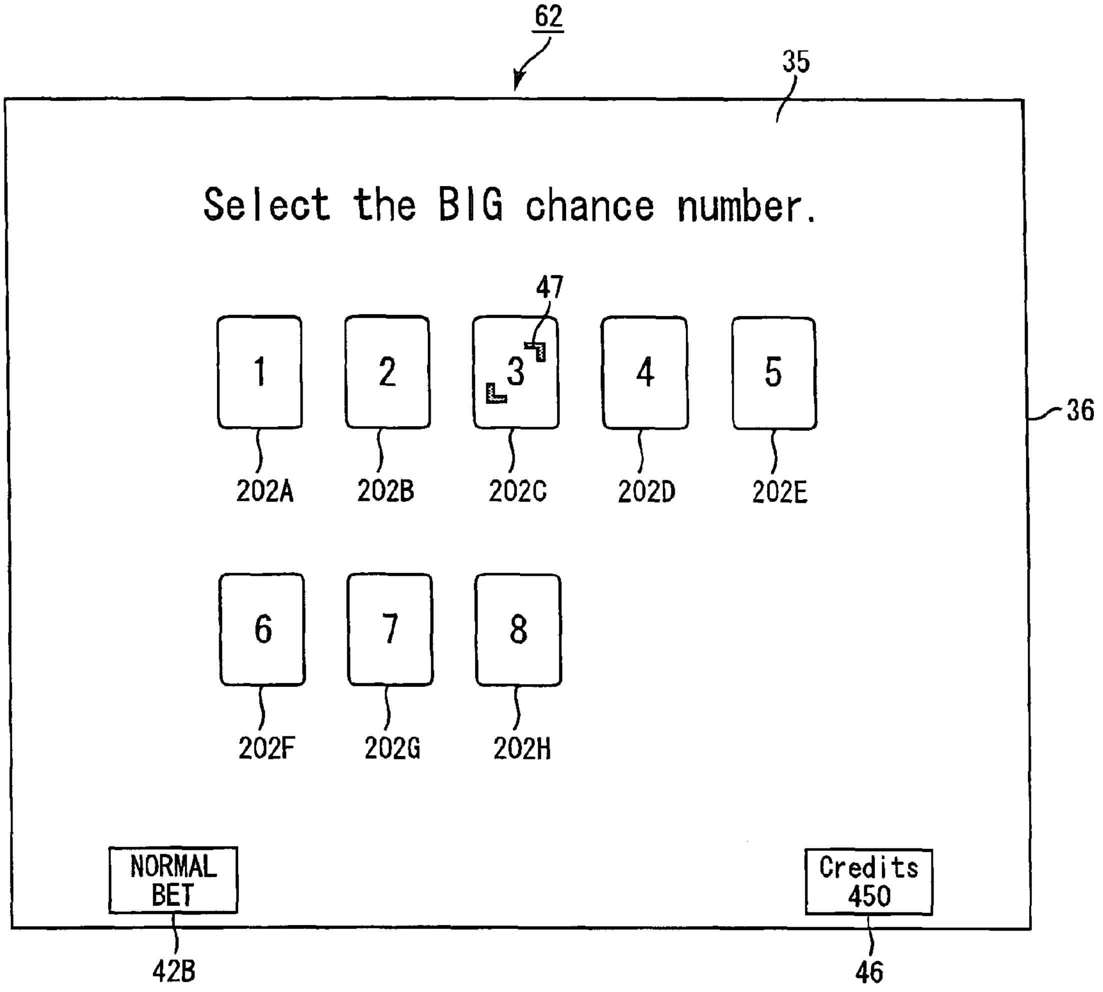
FIG. 8 is another exemplary view showing a display screen displayed to the image display.

FIG. 8 is an exemplary view showing a display screen displayed to the image display.

On the number-of-sub-die-sides selection screen 61, the BIG chance number selection screen 62 is displayed after the number N of sides of the sub die 700 is selected. It is to be noted that, among the display portions included in this BIG chance number selection screen 62, display portions having the same functions as those on the normal BET screen 40 and on the number-of-sub-die-sides selection screen 61 are provided with the same numerals, and detailed descriptions thereof are omitted.

On the BIG chance number selection screen 62, chance number images 202A to 202H each showing a later-described BIG chance number are displayed. The chance number image 202A is an image for selecting 1 as the BIG chance number. The chance number image 202B is an image for selecting 2 as the BIG chance number. The chance number image 202C is an image for selecting 3 as the BIG chance number. The chance number image 202D is an image for selecting 4 as the BIG chance number. The chance number image 202E is an image for selecting 5 as the BIG chance number. The chance number image 202F is an image for selecting 6 as the BIG chance number. The chance number image 202G is an image for selecting 7 as the BIG chance number. The chance number image 202H is an image for selecting 8 as the BIG chance number.

To the BIG chance number selection screen 62, the chance number image 202 is displayed, which shows a number smaller than the number N of sides of the sub die 700 selected on the number-of-sub-die-sides selection screen 61. Namely, when 8 is selected as the number N of sides of the sub die 700 on the number-of-sub-die-sides selection screen 61, the chance number images 202 each showing a number of 8 or less are displayed as the chance number images 202 to the BIG chance number selecting screen 62. Further, when 10 is selected as the number N of sides of the sub die 700 on the number-of-sub-die-sides selection screen 61, the chance number images 202 each showing a number of 10 or less are displayed as the chance number images 202 to the BIG chance number selection screen 62.

The player touches the touch panel 35 with the finger or the like to specify the chance number image 202 by using the cursor 47. For example, on the BIG chance number selection screen 62 shown in FIG. 8, the chance number image 202C for selecting 3 as the BIG chance number is specified. The player can select 3 as the BIG chance number by pressing the confirmation button 30 in this state. Information on the selected BIG chance number is stored in the RAM 113.

Figure 9:
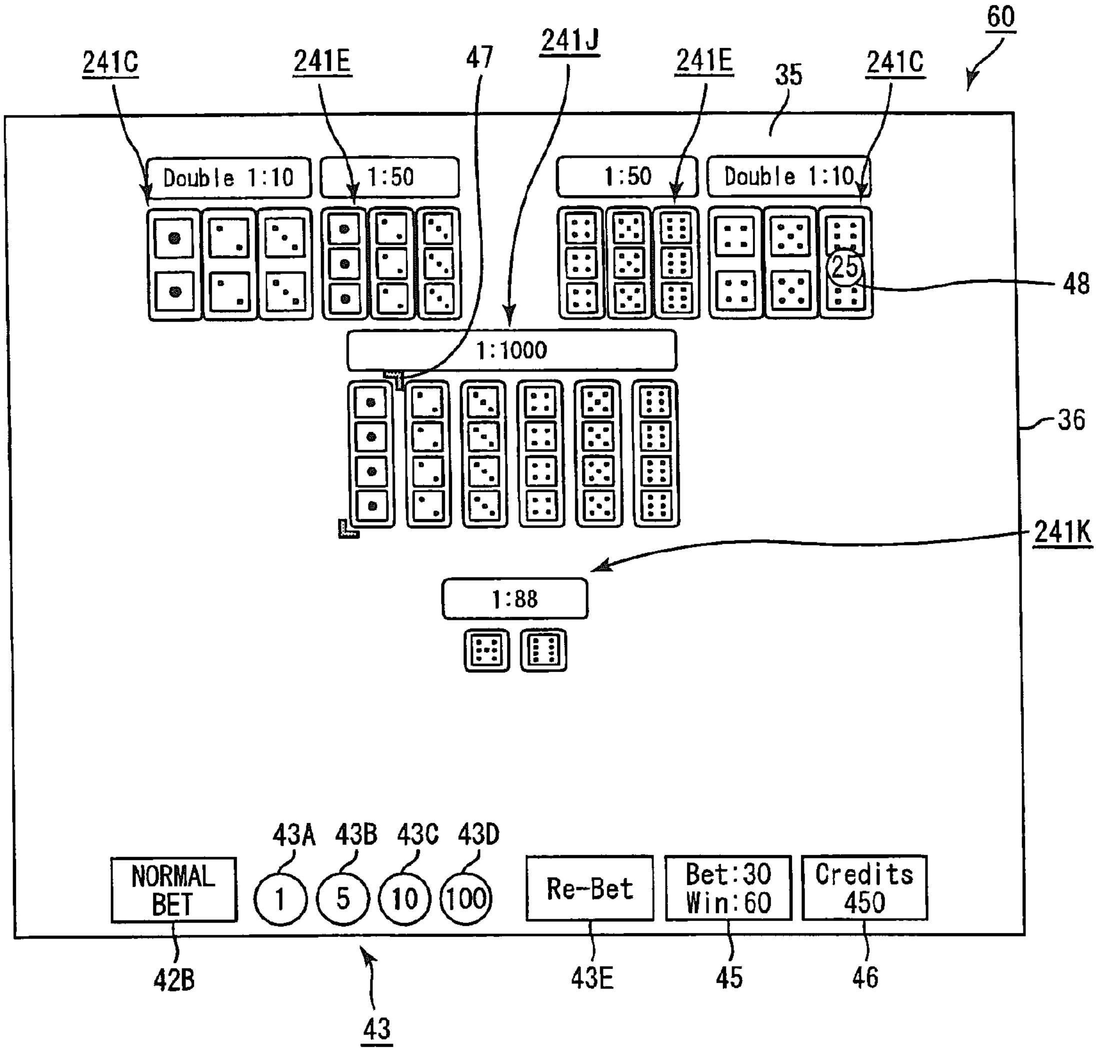
FIG. 9 is another exemplary view showing a display screen displayed to the image display.

FIG. 9 is an exemplary view showing a display screen displayed to the image display.

To the BIG chance number selection screen 62, the side BET image 60 is displayed after the BIG chance number is selected. It is to be noted that the side BET screen 60 shown in FIG. 9 is the side BET screen 60 displayed when 8 is selected as the number N of sides of the sub die 700 on the number-of-sub-die-sides selection screen 61. In addition, among this display portions included in the side BET screen 60, display portions having the same functions as those on the normal BET screen 40, on the number-of-sub-die-sides selection screen 61 and on the BIG chance number selection screen 62 are provided with the same numerals, and detailed descriptions thereof are omitted.

The side BET screen 60 is used when the player places a side BET based on a prediction of the outcomes of the three main dice 70 and the outcome of the sub die 700 displayed to the image display 7.

To the side BET screen 60, a plurality of BET areas 241 (a BET area 241C, a BET area 241E, a BET area 241J, a BET area 241K) are displayed, and a BET operation is performed by touching the touch panel 35 with the finger or the like to specify the BET area 241, and having chips displayed in the specified BET area 241.

The BET area 241C is a portion used when the player places a BET based on a prediction that the outcomes of two dice out of the three main dice 70 and the sub die 700 displayed to the image display 7 will be the same. Namely, the BET area 241C is used when the player places a BET based on a prediction that any of the combinations of the outcomes (1, 1), (2, 2), (3, 3), (4, 4), (5, 5) and (6, 6) will appear, out of the three main dice 70 and the sub die 700 displayed to the image display 7. The payout is set to 1:10.

The BET area 241E is a portion used when the player places a BET based on a prediction that the outcomes of three dice out of the three main dice 70 and the sub die 700 displayed to the image display 7 will be the same. Namely, the BET area 241E is used when the player places a BET based on a prediction that any of the combinations of the outcomes (1, 1, 1), (2, 2, 2), (3, 3, 3), (4, 4, 4), (5, 5, 5) and (6, 6, 6) will appear, out of the three main dice 70 and the sub die 700 displayed to the image display 7. The payout is set to 1:50.

The BET area 241J is a portion used when the player places a BET based on a prediction that all of the outcomes of three main dice 70 and the sub die 700 displayed to the image display 7 will be the same, and a prediction of the value that these four dice will have. Namely, the BET area 241J is used when the player places a BET based on a prediction that the outcomes of the four dice will be (1, 1, 1, 1), (2, 2, 2, 2), (3, 3, 3, 3), (4, 4, 4, 4), (5, 5, 5, 5) or (6, 6, 6, 6) and a prediction of the value that these four dice will have; the payout is set to 1:1000.

The BET area 241K is a portion where the player places a BET based on a prediction that the total value of the outcomes of the three main dice 70 and the outcome of the sub die 700 displayed to the image display 7 will be the same, and a prediction of that value. The BET area 241K is a BET area where the number of the betting objects changes in accordance with the number N of sides of the sub die 700 selected on the number-of-sub-die-sides selection screen 61. Namely, there are displayed the betting objects in number obtained by subtracting 6 from the selected number N of sides of the sub die 700. For example, when 8 is selected as the number N of sides of the sub die 700, two betting objects are displayed in the BET area 241K as shown in FIG. 9. For example, when 10 is selected as the number N of sides of the sub die 700, four betting objects are displayed in the BET area 241K.

Figure 10:
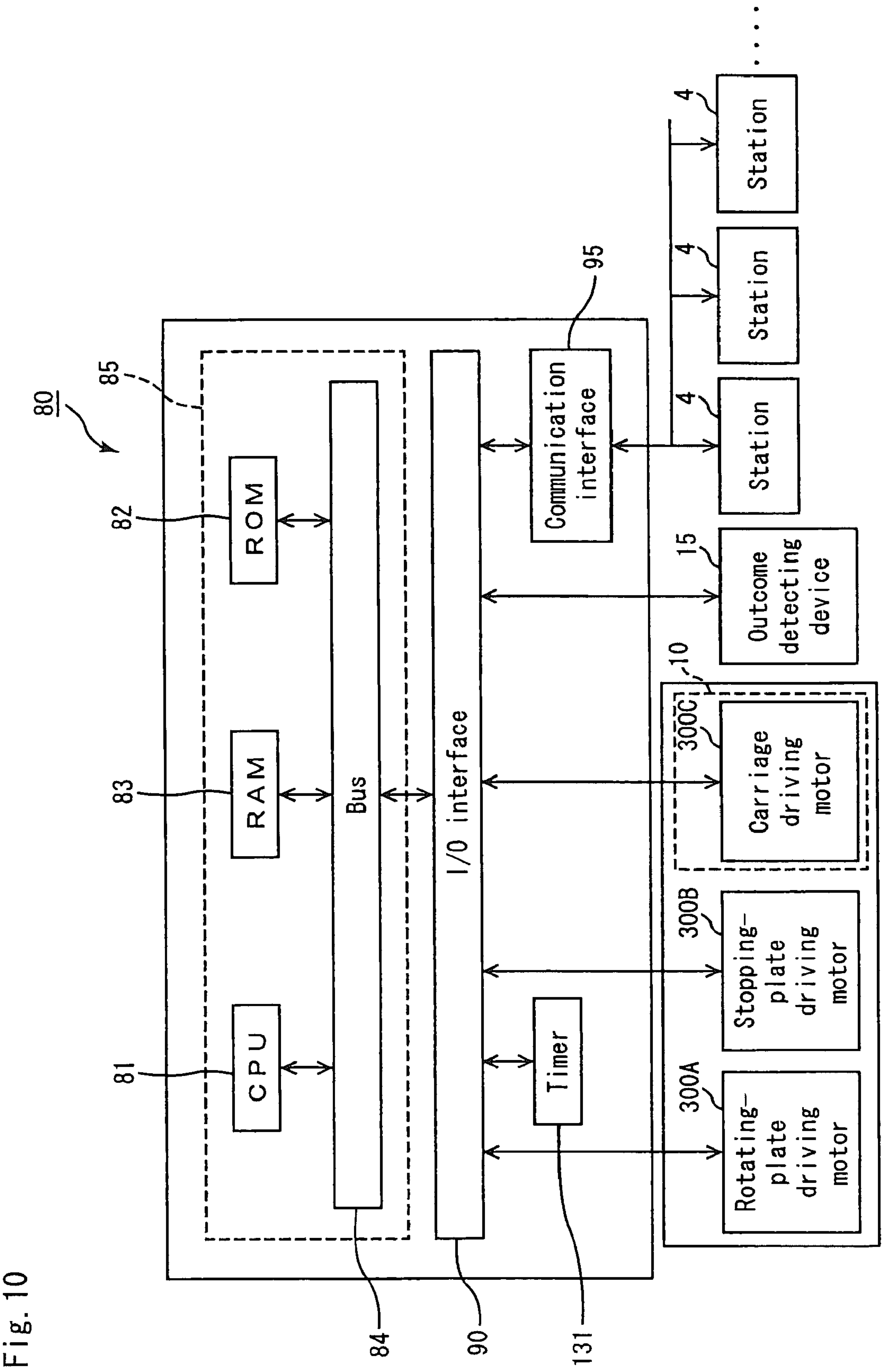
FIG. 10 is a block diagram showing an internal configuration of the gaming machine shown in FIG. 2.

FIG. 10 is a block diagram showing an internal configuration of the gaming machine shown in FIG. 2.

The main control portion 80 of the gaming machine 1 has a microcomputer 85, which mainly comprises a CPU 81, a ROM 82, a RAM 83, and a bus 84 that transfers data mutually thereamong.

The CPU 81 is connected to the rotating-plate driving motor 300A, the stopping-plate driving motor 300B and the carriage driving motor 300C, through an I/O interface 90. Further, through the I/O interface 90, the CPU 81 is connected to a timer 131 capable of measuring time. The I/O interface 90 is also connected with the foregoing outcome detecting device 15, and transmits and receives information on the outcomes of the three main dice 70 having stopped on the stopping plate 3*c*, and the like, to and from the outcome detecting device 15. Moreover, the I/O interface 90 is connected with a communication interface 95; through this communication interface 95, the main control portion 80 transmits and receives data such as BET information, information on the outcome of the sub die 700, and payout information, to and from each station 4.

The ROM 82 of the main control portion 80 stores programs for realizing a basic function of the gaming machine 1, specifically a program for controlling a variety of devices for driving the gaming portion 3, a program for controlling each station 4, and the like, and also stores a payout table, data showing predetermined time T, data showing a specific value TT, and the like.

The RAM 83 is a memory that temporarily stores a variety of data calculated in the CPU 81. For example, the RAM 83 temporarily stores BET information and information on the outcome of the sub die 700 transmitted from each station 4, information on the outcomes of the main dice 70 transmitted from the outcome detecting device 15, data on results of processing executed by the CPU 81, and the like.

Based on the data and programs stored in the ROM 82 and the RAM 83, the CPU 81 controls the rotating-plate driving motor 300A, the stopping-plate driving motor 300B and the carriage driving motor 300C which drive the gaming portion 3, throws the main dice 70 onto the rotating plate 3*b* of the gaming portion 3, and performs some other operations. Further, the CPU 81 executes control processing associated with the proceeding of the game, such as processing of checking the outcome of each of the main dice 70 having stopped on the stopping plate 3*c*.

In addition to the control processing associated with the proceeding of the game, the CPU 81 has the function of controlling each station 4 so as to make the game proceed, by transmitting and receiving data to and from each station 4. Specifically, the CPU 81 receives BET information transmitted from each station 4 and information on the outcome of the sub die 700. Further, based on the outcomes of the main dice 70, the outcome of the sub die 700 and the BET information transmitted from each station 4, the CPU 81 performs winning determination processing, to calculate an amount of payout to be paid out at each station 4 with reference to the payout table stored in the ROM 82.

Figure 11:
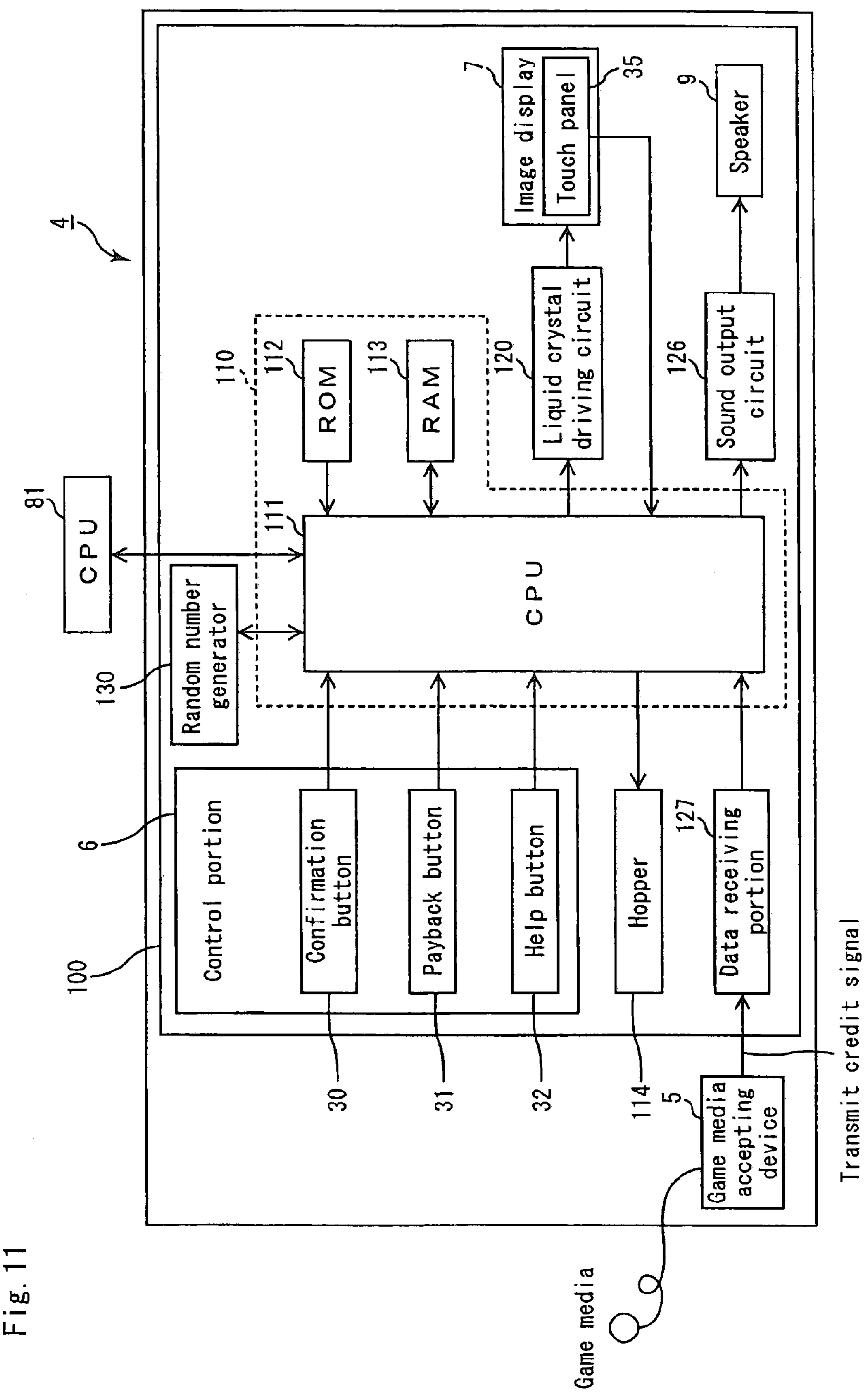
FIG. 11 is a block diagram showing an internal configuration of one of the stations shown in FIG. 2.

FIG. 11 is a block diagram showing an internal configuration of the station shown in FIG. 2.

The station 4 includes a body portion 100 provided with the image display 7 and the like, and the game media accepting device 5 installed on the body portion 100. Further, the body portion 100 includes a station-controlling portion 110 and several peripheral devices.

The station-controlling portion 110 includes a CPU 111, a ROM 112, and a RAM 113.

The ROM 112 stores a program for realizing a basic function of the station 4, a variety of programs necessary for controlling the station 4, a data table such as a chance game pattern table, and the like.

The RAM 113 is a memory that temporarily stores a variety of data calculated in the CPU 111, the number of credits owned by the player, the state of BETs placed by the player, and the like.

The CPU 111 is connected separately with the confirmation button 30, the payback button 31, and the help button 32 which are provided in the control portion 6. Further, based on an operation signal output at the press of each button or the like, the CPU 111 performs control so as to execute a variety of operations corresponding to the signal. Specifically, the CPU 111 executes a variety of processing, based on an input signal that is supplied from the control portion 6 when the player has input an operation and on the data and programs stored in the ROM 112 and the RAM 113, and transmits the results of the processing to the CPU 81 of the main control portion 80.

Further, the CPU 111 receives a command signal from the CPU 81 of the main control portion 80, to control the peripheral devices constituting the station 4. Moreover, the CPU 111 executes a variety of processing, based on input signals supplied from the control portion 6 and the touch panel 35 and on the data and programs stored in the ROM 112 and the RAM 113. Based on the results of the processing, the CPU 111 controls the peripheral devices constituting the station 4. It is to be noted that which method is to be applied in performing the processing is set for each processing according to the content of the processing. For example, the processing of paying out game media corresponds to the former, and the BET operation processing by the player corresponds to the latter.

The CPU 111 is connected with a hopper 114, and the hopper 114 pays out a predetermined number of game media from the payout exit 8 based on a command signal from the CPU 111.

The CPU 111 is connected with the image display 7 through a liquid crystal driving circuit 120. The liquid crystal driving circuit 120 includes a program ROM, an image ROM, an image control CPU, a work RAM, a VDP (video display processor), a video RAM, and the like. The program ROM stores an image control program regarding display to the image display 7 and a variety of selection tables. The image ROM stores, for example, dot data for forming an image displayed to the image display 7. Further, based on parameters set in the CPU 111, the image control CPU determines an image to be displayed to the image display 7 out of the dot data previously stored inside the image ROM, according to the image control program previously stored inside the program ROM. Moreover, the work RAM is configured as a temporary storage device in execution of the image control program in the image control CPU. Further, the VDP forms an image according to the display contents determined by the image control CPU, and outputs the image to the image display 7. It is to be noted that the video RAM is configured as a temporary storage device in formation of an image by the VDP.

The touch panel 35 is installed on the front surface of the image display 7, as described above, and information on the operation of the touch panel 35 is transmitted to the CPU 111. The touch panel 35 detects an input operation performed by the player on the normal BET screen 40, the side BET screen 60, the number-of-sub-die-sides selection screen 61, the BIG chance number selection screen 62 and the like. Specifically, selection of the BET areas 41 of the normal BET screen 40 and the BET areas 241 of the side BET screen 60, input using the unit BET buttons 43 and the like are performed by the operation of touching the touch panel 35, and the information of the operation is transmitted to the CPU 111. Based on the information, BET information of the player is stored in the PAM 113. Further, the BET information is transmitted to the CPU 81 of the main control portion 80, and stored in the BET information storage area in the RAM 83.

Further, the sound output circuit 126 and the speakers 9 are connected to the CPU 111, and the speakers 9 generate a variety of effect sounds when a variety of effects are produced based on output signals from the sound output circuit 126. Moreover, the CPU 111 is connected with the game media accepting device 5 functioning as a device into which game media such as medals or currency are inserted through a data receiving portion 127. The data receiving portion 127 receives a credit signal transmitted from the game media accepting device 5, and the CPU 111 increases the number of credits of the player stored in the RAM 113 based on the transmitted credit signal.

The CPU 111 is connected with a random number generator 130 that generates a random number.

Figure 12A:
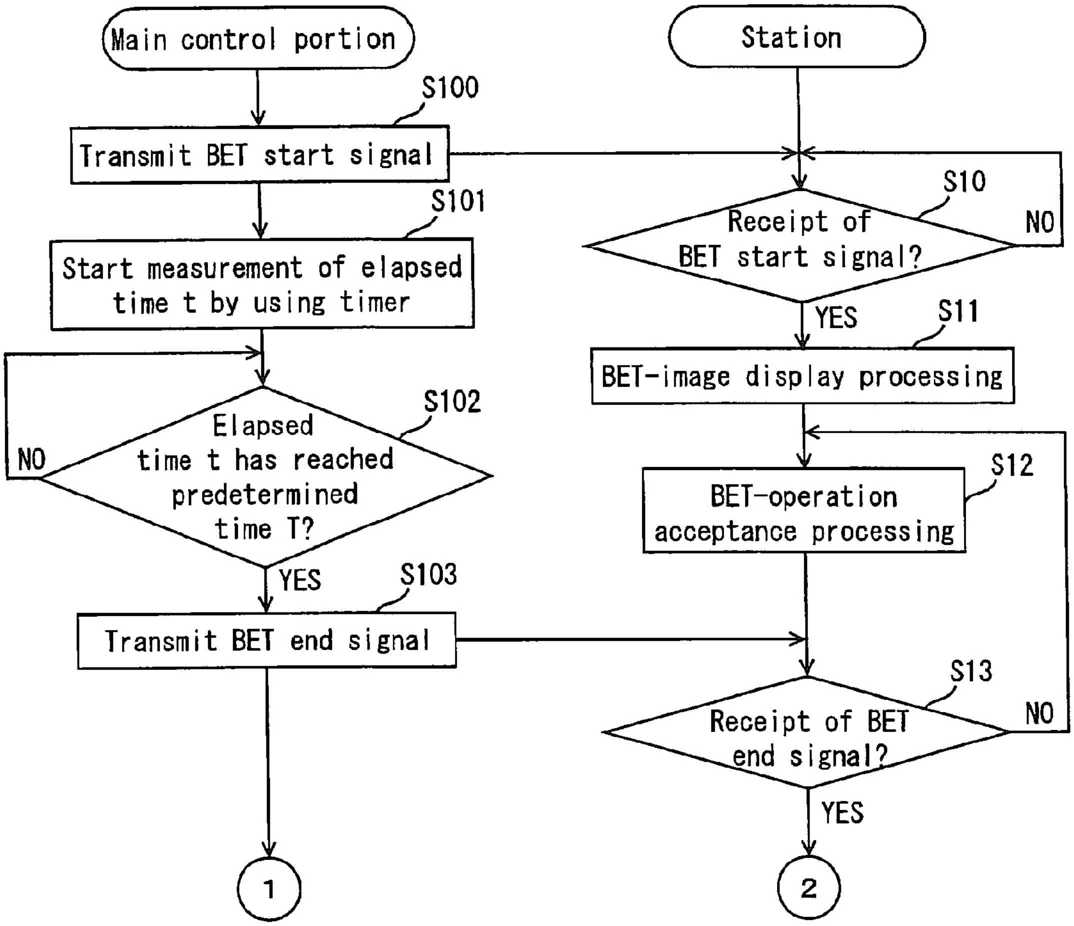
FIG. 12A is a flowchart showing game processing according to the present embodiment.
Figure 12B:
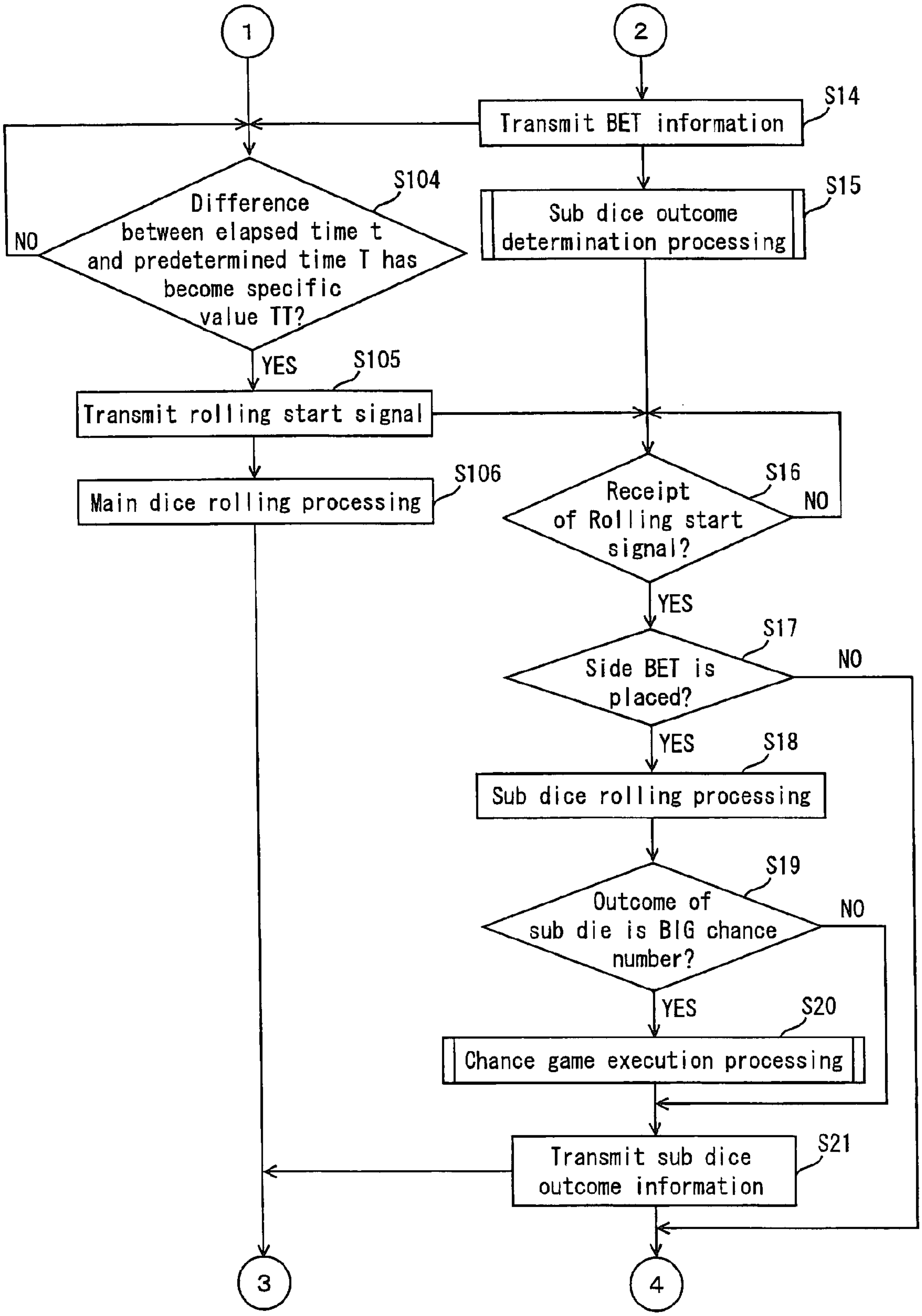
FIG. 12B is another flowchart showing game processing according to the present embodiment.
Figure 12C:
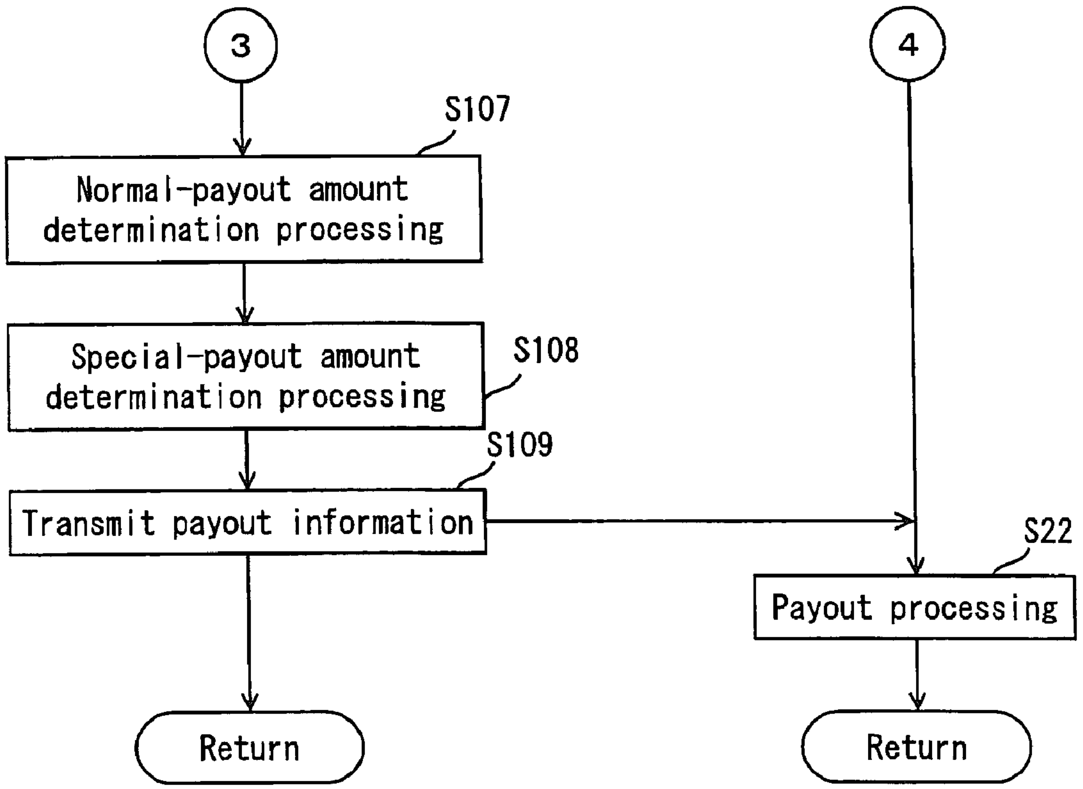
FIG. 12C is another flowchart showing game processing according to the present embodiment.

FIG. 12A to FIG. 12C are flowcharts showing game processing according to the present embodiment.

It is to be noted that in FIG. 12A to FIG. 12C, only processing in one of the stations 4 is shown for preventing complexity.

The main control portion 80 performs operations of steps S100 to S109.

First, in step S100, the CPU 81 transmits a BET start signal to each station 4.

In step S101, the CPU 81 starts measurement of elapsed time t by using the timer 131. Next, the CPU 81 compares the elapsed time t measured by using the timer 131 with data indicating predetermined time T stored in the ROM 82, and then determines whether or not the elapsed time t measured by using the timer 131 has reached the predetermined time T (step S102).

When determining in step S102 that the elapsed time t has not reached the predetermined time T, the CPU 81 returns the processing to step S102. On the other hand, when determining in step S102 that the elapsed time t has reached the predetermined time T, the CPU 81 transmits a BET end signal to each station 4 (step S103).

The CPU 81 determines whether or not the difference between the elapsed time t measured by using the timer 131 and the predetermined time T stored in the ROM 82 has become a specific value TT stored in the ROM 82 (step S104). In the processing, the CPU 81 first subtracts the predetermined time T stored in the ROM 82 from the elapsed time t measured by using the timer 131. The CPU 81 further compares the numeric value obtained by the subtraction with the specific value TT stored in the ROM 82, and determines whether or not the numeric value obtained by the subtraction has become the specific value TT stored in the ROM 82. By appropriately setting data showing the specific value TT, setting can be made such that processing of rolling the main dice 70 can be performed at a desired timing.

When determining in step S104 that the difference between the elapsed time t and the predetermined time T has not become the specific value TT, the CPU 81 returns the processing to step S104. On the other hand, when determining in step S104 that the difference between the elapsed time t and the predetermined time T has become the specific value TT, the CPU 81 transmits a rolling start signal to each station 4 (step S105).

The CPU 81 executes processing of rolling the main dice 70 in step S106. In the processing, based on the data and programs stored in the ROM 82 and the RAM 83, the CPU 81 controls the rotating-plate driving motor 300A, the stopping-plate driving motor 300B and the carriage driving motor 300C so as to perform control of throwing in the main dice 70, control of rolling the main dice 70, control of stopping the main dice 70, and the like. Further, the CPU 81 executes control processing associated with the proceeding of the game, such as processing of checking the outcome of each of the main dice 70 having stopped on the stopping plate 3*c* and the like.

In step S107, the CPU 81 executes normal-payout amount determination processing. In the processing, the CPU 81 executes winning determination processing, based on the information on the outcomes of the main dice 70 having stopped on the stopping plate 3*c* and the BET information received from each station 4. The CPU 81 then calculates an amount of normal payout to be paid out at each station 4 with reference to the payout table stored in the ROM 82.

In step S108, the CPU 81 executes special-payout amount determination processing. In the processing, the CPU 81 executes winning determination processing, based on the information on the outcomes of the main dice 70 having stopped on the stopping plate 3*c*, information on the outcome of the sub die 700 received from each station 4, and the BET information received from each station 4. The CPU 81 then calculates an amount of special payout to be paid out at each station with reference to the payout table stored in the ROM 82. Further, as for the amount of special payout at the station 4 from which result information of a later-described chance game was transmitted, an amount obtained by multiplying the calculated amount of special payout by the rate number included in the result information of the chance game is determined as the amount of the special payout.

In step S109, the CPU 81 transmits payout information to each station 4. In the processing, the CPU 81 transmits, to each station 4, information on the amount of normal payout determined in step S107 and the amount of special payout determined in step S108.

Meanwhile, each station 4 executes respective operations of steps S10 to S22.

First, in step S10, the CPU 111 determines whether or not a BET start signal has been received from the main control portion 80. When determining that the BET start signal has not been received, the CPU 111 returns the processing to step S10. On the other hand, when determining that the BET start signal has been received, the CPU 111 shifts the processing to step S11.

The CPU 111 executes BET-image display processing in step S11. In the processing, the CPU 111 displays the normal BET screen 40 shown in FIG. 6 to the image display 7.

The CPU 111 executes BET-operation acceptance processing in step S12. In the processing, the CPU 111 accepts a normal BET input by the player through the touch panel 35. Further, the CPU 111 displays the number-of-sub-die-sides selection screen 61, the BIG chance number selection screen 62 and the side BET screen 60 to the image display 7 according to the input operation performed by the player through the touch panel 35. The CPU 111 then accepts an input of selecting the number of sides of the sub die 700, an input of selecting the BIG chance number, and a side BET input.

The CPU 111 determines whether or not a BET end signal has been received from the main control portion 80 (step S13). When determining that the BET end signal has not been received, the CPU 111 returns the processing to step S12. On the other hand, when determining that the BET end signal has been received, the CPU 111 shifts the processing to step S14.

The CPU 111 transmits the BET information to the main control portion 80 in step S14. In the processing, the CPU 111 transmits to the main control portion 80 information regarding the normal BET input and the side BET input, the information having been accepted in step S12, as BET information. It is to be noted that the BET information includes the identification number of the station 4.

In step S15, the CPU 111 executes outcome determination processing of the sub die 700. In this processing, the CPU 111 executes processing of determining the outcome of the sub die 700. The outcome determination processing of the sub die 700 will be specifically described later using a drawing.

The CPU 111 determines whether or not a rolling start signal has been received from the main control portion 80 (step S16). When determining that the rolling start signal has not been received, the CPU 111 returns the processing to step S16. On the other hand, when determining that the rolling start signal has been received, the CPU 111 shifts the processing to step S17.

The CPU 111 determines whether or not a side BET input has been accepted in step S12 (step S17). When determining that the side BET input has not been accepted, the CPU 111 shifts the processing to step S22. On the other hand, when determining that the side BET input has been accepted, the CPU 111 shifts the processing to step S18.

The CPU 111 executes sub dice rolling processing in step S18. In the processing, the CPU 111 displays to the image display 7 an image showing the state of rolling of the sub die 700 having the number of sides accepted in step S12. Further, the CPU 111 displays to the image display 7 an image showing the state of stopping of the sub die 700 having the number of sides accepted in step S12 with the outcome determined in step S15. One example of the images of the sub die 700 displayed to the image display 7 is shown in FIG. 1.

FIG. 1 is a view showing one example of the display screens displayed to the image display.

In FIG. 1, the sub dice stop image 242 showing the state of stopping of the 8-sided sub die 700 is displayed in the lower right portion of the side BET screen 60 shown in FIG. 9. In the present embodiment, this sub dice stop image 242 is displayed in the case of accepting the side BET input in step S12. In FIG. 1, the outcome of the sub die 700 is 5.

Returning to FIG. 12B, the CPU 111 determines whether or not the outcome of the sub die 700 determined in step S15 is identical with the BIG chance number accepted in step S12 (step S19). When determining that the outcome of the sub die 700 is not identical with the BIG chance number, the CPU 111 shifts the processing to step S21. On the other hand, when determining that the outcome of the sub die 700 is identical with the BIG chance number, the CPU 111 shifts the processing to step S20.

The CPU 111 executes chance game execution processing in step S20. In this processing, the CPU 111 executes the processing of executing a chance game for determining the rate number which is to be referred in determining the amount of special payout. This chance game execution processing is specifically described later using a drawing.

The CPU 111 transmits to the main control portion 80 information on the outcome of the sub die 700 which has been determined in step S15 (step S21). Further, when executing the chance game execution processing in step S20, the CPU 111 transmits information on a result of the chance game including information on the rate number to the main control portion 80. It is to be noted that the information includes an identification number of the station 4.

The CPU 111 executes payout processing in step S22. In the processing, based on the payout information received from the main control portion 80, the CPU 111 updates the number of credits of the player stored in the RAM 113, and also updates display of the payback result display portion 45 and the number-of-credits display portion 46.

Figure 13:
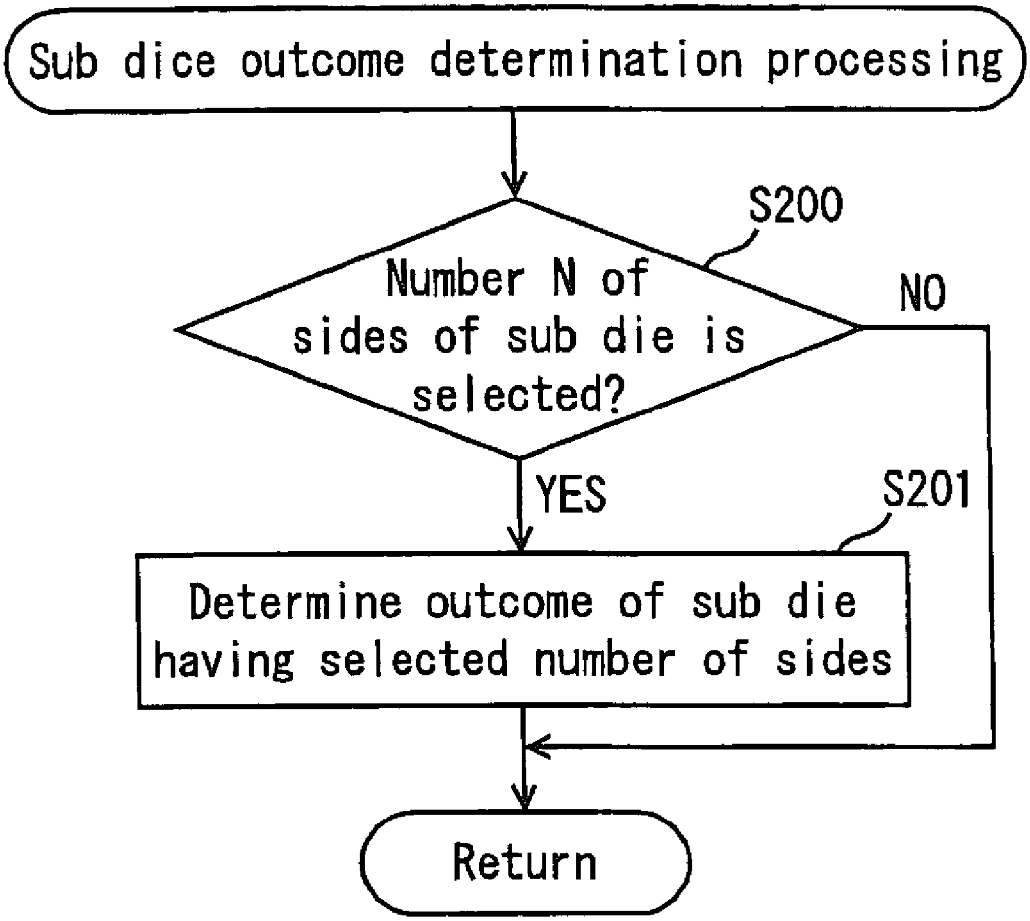
FIG. 13 is a flowchart showing sub dice outcome determination processing executed in a station.

FIG. 13 is a flowchart showing sub dice outcome determination processing executed in the station.

First, the CPU 111 determines whether or not to have accepted the input of selecting the number N of sides of the sub die 700 (step S200). When determining that the input of selecting the number N of sides of the sub die 700 has not been accepted, the CPU 111 terminates the present subroutine. On the other hand, when determining that the input of selecting the number N of sides of the sub die 700 has been accepted, the CPU 111 shifts the processing to step S201.

In step S201, the CPU 111 executes the outcome determination processing of the sub die 700. In this processing, the CPU 111 determines the outcome of the sub die 700 having the number of sides accepted in step S12 out of numbers from 1 to the above number of sides by using a random number. For example, when accepting the input of selecting the number of sides being eight, the CPU 111 determines one number out of 1 to 8 by using a random number, and determines the determined number as the outcome of the sub die 700.

FIG. 14 is an exemplary view schematically showing a chance game pattern table.

In the chance game pattern table, pattern image data which shows rate numbers to be referred to in determining the amount of special payout is stored in a state of corresponding to the number of sides of the sub die 700. For example, with respect to the number of faces being eight, pattern image data showing "×1" as a pattern 1, pattern image data showing "×1.6" as a pattern 2, pattern image data showing "×1" as a pattern 3, pattern image data showing "×1" as a pattern 4, and pattern image data showing "×1.3" as a pattern 5 are stored. These pattern image data respectively correspond to rate numbers 1, 1.6, 1, 1, 1.3. In the chance game pattern table in the present embodiment, the rate number is set to gradually increase with increase in the number of sides of the sub die 700.

The pattern image data is data for displaying a pattern to be displayed to the image display 7 in execution of the chance game. With the pattern image data showing "×1", a pattern showing "×1" is displayed to the image display 7. For example, when the number of sides of the sub die 700 is eight, in execution of the chance game, there are displayed to the image display 7 the pattern showing "×1" as the pattern 1, a pattern showing "×1.6" as the pattern 2, a pattern showing "×1" as the pattern 3, a pattern showing "×1" as the pattern 4, and a pattern showing "×1.6" as the pattern 5.

Figure 15:
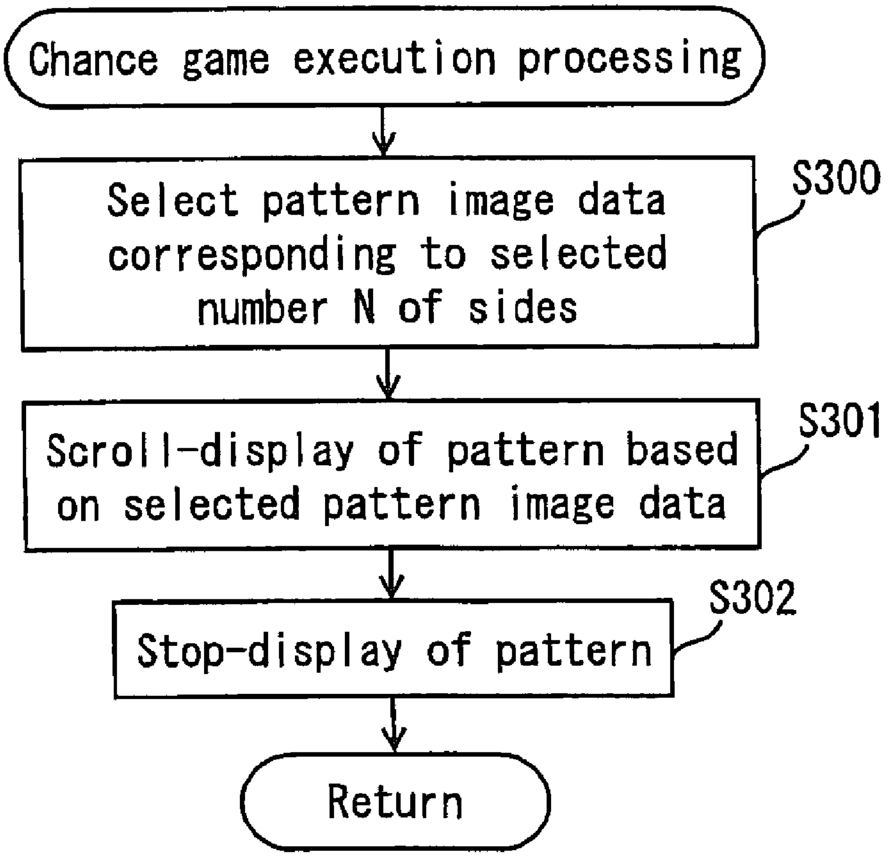
FIG. 15 is a flowchart showing chance game execution processing executed in a station.

FIG. 15 is a flowchart showing the chance game execution processing executed in a station.

First, in step S300, the CPU 111 selects the pattern image data of the patterns 1 to 5, which is stored in a state corresponding to the number of sides of the sub die 700 accepted in step S12, with reference to the chance game pattern table stored in the ROM 112, and stores the selected data in the RAM 113.

Based on the pattern image data of the patterns 1 to 5 selected in step S300, the CPU 111 scroll-displays the patterns 1 to 5 to the image display 7 (step S301). For example, when the number of sides of the sub die 700 accepted in step S12 is 8, there are stop-displayed to the image display 7 the pattern showing "×1" as the pattern 1, the pattern showing "×1.6" as the pattern 2, the pattern showing "×1" as the pattern 3, the pattern showing "×1" as the pattern 4, and the pattern showing "×1.6" as the pattern 5.

After scroll-displaying the patterns 1 to 5 in step S301 for a predetermined period of time, the CPU 111 determines one pattern out of the patterns 1 to 5 by using a random number, and then, stops and displays the determined pattern to the image display 7 (step S302). Further, the CPU 111 stores the rate numbers corresponding to the determined pattern in the RAM 113.

As described above, according to the gaming machine 1 and the control method of the gaming machine 1, a side BET can be input based on a prediction of the outcomes of the three main dice 70 and the outcome of the sub die 700. Since the number of betting objects is large in the side BET as compared with the normal BET in which only the outcomes of the three main dice 70 are predicted, the player has wider options in betting so as to be prevented from becoming tired of the game. Further, with the number of dice increased, a betting object having an extremely low appearance probability is generated; hence, for example by increasing a payout rate of that betting object, it is possible to make the player have a high expectation toward a high payout.

An image 242 showing the state of stopping of the sub die 700 is displayed only in the station 4 where the side BET has been input. This allows the player to see that another player has placed a side BET when looking at display of the image 242 showing the state of stopping of a sub die 700 in a station 4 where another player is playing a game. Therefore, according to the above-mentioned gaming machine 1 and the control method of the gaming machine 1, it is possible to have players around the player having placed the side BET to feel a desire to place a side BET.

The sub die 700 displayed in the station 4 is not a six-sided die used in the normal dice game, but an N-sided (N being an integer of seven or more) die. Accordingly, it is possible to make the player feel enjoyment which cannot be felt in the conventional dice games, so that the interesting aspects of the game can be enhanced. Further, the player can select the number N of sides of the sub die 700. Therefore, since the sub die 700 having the number of sides selected by the player at his or her will can be displayed in the station 4, it is possible to make the player feel satisfied.

Moreover, payout offering conditions are set being different in the case of the outcome of the sub die 700 being six or less and in the case of the outcome of the sub die being seven or more. As thus described, since the payout offering conditions are set being different depending on the outcome of the sub die 700, it is possible to make the player place the BET while feeling enjoyment. Further, in the case of the outcome of the sub die 700 being seven or more, a special payout is offered when the outcome of the sub die 700 and a total value of the outcome of the three main dice 90 are the same numeric value. Setting the payout offering condition that does not exist in the conventional dice game can further enhance the interesting aspects of the game.

A chance game in which an amount of the special payout to be offered may be changed is executed when the outcome of the sub die 700 is a BIG chance number. Then, the amount of the special payout is determined based on a result of the executed chance game. Executing the chance game different from the normal game can prevent the player from becoming tired of the game. Further, since the amount of the special payout to be offered may be changed, it is possible to excite the player.

The player can select the BIG chance number. Therefore, it is possible to select the BIG chance number based on a prediction of the outcome of the sub die 700, so that the player gets into the game.

Although the case has been described in the present embodiment where the chance game is a game in which a rate number is scroll-displayed to the image display 7, the chance game in the present invention is not particularly limited, so long as it is a game in which the amount of the special payout to be offered may be changed. For example, it may be a game in which cards with patterns drawn thereon are displayed facing down and the amount of the special payout to be offered is determined based on the pattern drawn on the rear side of the card selected by the player. Moreover, it may be a game in which a reel provided in the station is rotated and then stopped, and the amount of the special payout to be offered is determined based on the symbol drawn on the stopped reel.

Although the case has been described in the present embodiment where an optional number can be selected as the BIG chance number so long as it is a number not larger than the number of sides of the sub die 700 selected by the player, in the present invention, only a part of numbers may be set to be selectable out of numbers smaller than the number of sides of the sub die selected by the player.

Although the case has been described in the present embodiment where the player can select the BIG chance number, in the present invention, a predetermined numeric value may be set to be unselectable by the player.

Although the case has been described in the present embodiment where the number N of sides of the sub die 700 is in the range of 7 to 12, in the present invention, the number of sides of the sub die is not limited so long as it is seven or more, and for example, the number of sides of the sub die may be 100.

Although the case has been described in the present embodiment where the outcome of the sub die 700 is determined by using a random number, the method for determining the outcome of the sub die is not particularly limited in the present invention; for example, a table where the order of the outcomes of the sub die is stored may be previously prepared, and the outcome of the sub die may be determined based on the table.

Although the case has been described in the present embodiment where the outcome of the sub die 700 displayed to the image display 7 can vary in respective stations even the numbers of sides of the sub die 700 are identical, in the present invention, the outcome of the sub die may be uniform in the stations in which sub dice having the identical numbers of sides are displayed. In this case, the outcome of the sub die 700 is determined with respect to each number of sides in the main control portion 80, and the information on the outcome of the sub die 700 is transmitted to each station 4.

Although the case has bee described in the present embodiment where the number of the sub die 700 displayed to the image display 7 is one, in the present invention, the number of the sub dice is not limited, and for example, the number of the sub dice may be five. Moreover, respective numbers of sides of a plurality of the sub dice may be set to be selectable by the player. Further, the number of the sub dice displayed to the image display may be set to be selectable by the player.

Although the case has been described in the present embodiment where the number of the main dice 70 is three, the number of the main dice is not limited in the present invention, and for example, the number of the main dice may be five.

Although the case has been described in the present embodiment where the real main dice 70 roll in the gaming portion 3, a configuration may be adopted in the present invention in which a main image display is installed separately from the image display provided in the station and an image showing the state of rolling of the main dice is displayed to the main image display, without using real main dice.

In this case, the CPU 81 is connected, through the I/O interface 90, with a random number generator 130B and a liquid crystal driving circuit 120B equivalent to the liquid crystal driving circuit 120 provided in the station 4. Further, the CPU 81 is connected with a main image display 701 through the liquid crystal driving circuit 120B.

After transmitting a rolling start signal to the station 4, the CPU 81 determines the outcome of each of the main dice 70 by using a random number. The CPU 81 then displays an image showing the state of rolling of the main dice 70 to the main image display 701. The CPU 81 further displays an image showing the state of the stopping of the main dice 70 with the determined outcomes, to the main image display 701.

Although the case has been described in the present embodiment where the image display is not installed in any place other than the station 4, a configuration may be adopted in the present invention in which the main image display is installed in the gaming machine separately from the image display provided in the station and an image showing the state of rolling of the main dice in the gaming portion is displayed to the main image display.

In this case, the CPU 81 is connected, through the I/O interface 90, with a main dice photographing device 701 having a CCD camera 17B and the liquid crystal driving circuit 120B equivalent to the liquid crystal driving circuit 120 provided in the station 4. Further, the CPU 81 is connected with the main dice photographing device 701 through the liquid crystal driving circuit 120B. The CCD camera 17B provided in the main dice photographing device 701 is installed at an angle that allows photographing of the gaming portion 3.

The CPU 81 displays an image showing the state of rolling of the main dice 70 in the gaming portion 3 to the main image display 701, based on the signal transmitted from the main dice photographing device 701.

Although the case has been described in the present embodiment where the outcomes of the main dice 70 are detected using the CCD camera 17, the method for detecting the outcomes of the main dice is not particularly limited in the present invention. For example, an identifiable device, such as a device reactive to magnetism, may be previously imbedded inside each of the main dice, and its outcome may be detected by the use of a magnetic change in the device. Moreover, an optical sensor may be used to detect the outcomes of the main dice.

Although the case has been described in the present embodiment where the main dice 70 are rolled using the rotating-plate driving motor 300A, the stopping-plate driving motor 300B and the carriage driving motor 300C, the method for rolling the main dice is not particularly limited; for example, a configuration may be adopted in which the main dice are rolled on a vibration plate. Further, the main dice may not be collected, but may be in a constantly exposed state inside the gaming portion.

Although the case has been described in the present embodiment where the controller in the present invention includes the CPU 81 provided in the main control portion 80 and the CPU 111 provided in the station 4, the controller in the present invention may be configured by a single CPU.

Although the present invention has been described with reference to embodiments thereof, these embodiments merely illustrate specific examples, not restrict the present invention. The specific structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there has been described processing to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processes described in the present specification are to be executed by various types of devices, in principle. Further, other structures required for conducting each step will be apparent from the aforementioned description.

What is claimed as new and desired to be secured by Letters Patent of the United States is:

1. A gaming machine, comprising:

a gaming portion in which a plurality of main dice roll and stop;

a station having an image display capable of displaying an image, and an input device with which a player can make an input of selecting a number N (N being an integer of seven or more) of sides of a sub die and can place a normal BET and a side BET different from said normal BET, based on a prediction of the outcomes of dice, said sub die being to be displayed to said image display; and a controller, said controller programmed to execute the processing of (A) accepting said normal BET from said input device provided in said station, (B) accepting said side BET from said input device provided in said station, (C) accepting the input of selecting the number N of sides of said sub die being to be displayed to said image display from said input device provided in said station, (D) rolling and stopping the plurality of said main dice in said gaming portion, (E) determining the outcome of said sub die having the number of sides accepted in said processing (C), (F) displaying at least an image showing the state of stopping of said sub die having the number of sides accepted in said processing (C) with the outcome determined in said processing (E), to said image display provided in said station where the input of selecting the number N of sides of said sub die has been made, (G) offering a normal payout based on the outcomes of the plurality of said main dice stopped in said processing (D) and said normal BET accepted in said processing (A), and (H) offering a special payout based on the outcomes of the plurality of said main dice stopped in said processing (D), the outcome of said sub die displayed in said processing (F), and said side BET accepted in said processing (B).

2. The gaming machine according to claim 1, wherein said controller is further programmed to execute the processing of (I) executing a chance game in which an amount of the special payout to be offered in said processing (H) may be changed when the outcome of said sub die displayed in said processing (F) is a predetermined numeric value, and said processing (H) includes (H-1) determining the larger amount of the special payout for the larger number N of sides of said sub die accepted in said processing (C), based on a result of the chance game executed in said processing (I).

3. The gaming machine according to claim 2, wherein said input device further enables the player to make an input of selecting said predetermined numeric value, said controller is further programmed to execute processing of (J) accepting the input of selecting said predetermined numeric value from said input device provided in said station, and said processing (I) is processing of executing the chance game in which the amount of the special payout to be offered in said processing (H) may be changed when the outcome of said sub die displayed in said processing (F) is said predetermined numeric value accepted in said processing (J).

4. A gaming machine, comprising:

a main image display capable of displaying an image;

a station having an image display capable of displaying an image, and an input device with which a player can make an input of selecting the number N (N being an integer of seven or more) of sides of a sub die and can place a normal BET and a side BET different from said normal BET, based on a prediction of the outcomes of dice, said sub die being to be displayed to said image display; and a controller, said controller programmed to execute the processing of (A) accepting said normal BET from said input device provided in said station, (B) accepting said side BET from said input device provided in said station, (C) accepting the input of selecting the number N of sides of said sub die being to be displayed to said image display from said input device provided in said station, (D) determining the outcomes of a plurality of main dice to be displayed to said main image display, (E) displaying at least an image showing the state of stopping of the plurality of said main dice with the outcomes determined in said processing (D), to said main image display, (F) determining the outcome of said sub die having the number of sides accepted in said processing (C), (G) displaying at least an image showing the state of stopping of said sub die having the number of sides accepted in said processing (C) with the outcome determined in said processing (F), to said image display provided in said station where the input of selecting the number N of sides of said sub die has been made, (H) offering a normal payout based on the outcomes of the plurality of said main dice displayed in said processing (E) and said normal BET accepted in said processing (A), and (I) offering a special payout based on the outcomes of the plurality of said main dice displayed in said processing (E), the outcome of said sub die displayed in said processing (G), and said side BET accepted in said processing (B).

5. The gaming machine according to claim 4, wherein said controller is further programmed to execute the processing of (J) executing a chance game in which an amount of the special payout to be offered in said processing (I) may be changed corresponding to a different numeric value of the sub die when the outcome of said sub die displayed in said processing (G) is a predetermined numeric value, and said processing (I) includes (I-1) determining the larger amount of the special payout for the larger number N of sides of said sub die accepted in said processing (C), based on a result of the chance game executed in said processing (J).

6. The gaming machine according to claim 5, wherein said input device further enables the player to make an input of selecting said predetermined numeric value, said controller is further programmed to execute the processing of (K) accepting the input of selecting said predetermined numeric value from said input device provided in said station, and said processing (J) is processing of executing the chance game in which the amount of the special payout to be offered in said processing (I) may be changed when the outcome of said sub die displayed in said processing (G) is said predetermined numeric value accepted in said processing (K).

7. A control method of the gaming machine, the method comprising the steps of:

(A) accepting a normal BET from an input device with which a player can make an input of selecting the number N (N being an integer of seven or more) of sides of a sub die and can place said normal BET and a side BET different from said normal BET based on a prediction of the outcomes of dice, said input device being provided in a station and said sub die being to be displayed to an image display capable of displaying an image;

(B) accepting said side BET from said input device provided in said station;

(C) accepting the input of selecting the number N of sides of said sub die being to be displayed to said image display, from said input device provided in said station;

(D) determining the outcomes of a plurality of main dice to be displayed to a main image display capable of displaying an image;

(E) displaying at least an image showing the state of stopping of the plurality of said main dice with the outcomes determined in said step (D), to said main image display;

(F) determining the outcome of said sub die having the number of sides accepted in said step (C);

(G) displaying at least an image showing the state of stopping of said sub die having the number of sides accepted in said step (C) with the outcome determined in said step (F), to said image display provided in said station where the input of selecting the number N of sides of said sub die has been made;

(H) offering a normal payout based on the outcomes of the plurality of said main dice displayed in said step (E) and said normal BET accepted in said step (A); and (I) offering a special payout based on the outcomes of the plurality of said main dice displayed in said step (E), the outcome of said sub die displayed in said step (G), and said side BET accepted in said step (B).

* * * * *